(12) United States Patent
Rogers et al.

(10) Patent No.: US 12,533,228 B2
(45) Date of Patent: Jan. 27, 2026

(54) WIRELESS, LCR-BASED, PASSIVE SENSOR SYSTEMS FOR IMPLANTABLE DEPLOYMENT USING COLLAPSIBLE ELECTROMECHANICS AND APPLICATIONS OF SAME

(71) Applicant: NORTHWESTERN UNIVERSITY, Evanston, IL (US)

(72) Inventors: John A. Rogers, Wilmette, IL (US); Anthony R. Banks, Evanston, IL (US); Di Lu, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 513 days.

(21) Appl. No.: 18/024,327

(22) PCT Filed: Sep. 7, 2021

(86) PCT No.: PCT/US2021/049286
§ 371 (c)(1),
(2) Date: Mar. 2, 2023

(87) PCT Pub. No.: WO2022/051716
PCT Pub. Date: Mar. 10, 2022

(65) Prior Publication Data
US 2023/0277303 A1      Sep. 7, 2023

Related U.S. Application Data

(60) Provisional application No. 63/074,680, filed on Sep. 4, 2020.

(51) Int. Cl.
*A61F 2/24* (2006.01)
*A61B 5/00* (2006.01)
*A61B 5/0215* (2006.01)

(52) U.S. Cl.
CPC .............. *A61F 2/24* (2013.01); *A61B 5/0215* (2013.01); *A61B 5/686* (2013.01); *A61B 5/6869* (2013.01)

(58) Field of Classification Search
CPC ... A61B 5/0215; A61B 5/4836; A61B 5/6852; A61B 5/686; A61B 5/6869; A61F 2/24; A61F 2/2418; A61F 2250/0002
See application file for complete search history.

(56) References Cited

U.S. PATENT DOCUMENTS

2012/0064409 A1   3/2012   Zhamu et al.
2015/0072162 A1   3/2015   Hersam et al.
(Continued)

OTHER PUBLICATIONS

W.- G Ma et al., J Thorac Dis. Dec. 2015; 7(12): 2321-2329.
(Continued)

*Primary Examiner* — Jon Eric C Morales
(74) *Attorney, Agent, or Firm* — troutman pepper locke; Tim Tingkang Xia, Esq.

(57) ABSTRACT

Provided are systems and methods for wireless, LCR-based, passive sensor systems for catheter or other implantable deployment using collapsible electromechanics. Each sensor system includes a deformable coil and a capacitive pressure sensor, collectively forming a LCR circuit having a self-resonant frequency. Multiple sensor systems may be implanted in a collapsible artificial valve to non-invasively detect the status of the collapsible artificial valve. Specifically, when the collapsible artificial valve is implanted in a mammal subject, antennas may be disposed on the skin of the mammal subject to wirelessly measure the self-resonant frequencies of the LCR circuits of the sensor systems. Thus, the blood pressure of the mammal subject may be calculated based on the self-resonant frequencies measured by the antenna, and the status of the collapsible artificial valve may be determined based on the blood pressure.

51 Claims, 24 Drawing Sheets

(56) References Cited

U.S. PATENT DOCUMENTS

2016/0045316 A1    2/2016  Braido et al.
2017/0258585 A1    9/2017  Marquez et al.
2020/0222185 A1    7/2020  Kappetein et al.

OTHER PUBLICATIONS

Koo et al., Nature Medicine 2018.
EPO, "Supplementary European Search Report for EP Application No. 21865266.7", The Hague, Germany, Sep. 20, 2024.
Korean Intellectual Property Office (ISR/KR), "International Search Report for PCT/US2021/044873", Korea, Dec. 23, 2021.
Lim, J. et al., "High Volumetric Energy and Power Density $Li_2TiSiO_5$ Battery Anodes via Graphene Functionalization", Matter, Aug. 5, 2020, vol. 3, pp. 522-533.
Wei, G. et al., "Graphene coated $La^{3+}/Sc^{3+}$ co-doped $Li_4Ti_5O_{12}$ anodes for enhanced Li-ion battery performance", Materials Letters, 2017, [Epub.] Jan. 22, 2017, vol. 193, pp. 179-182.
Chen. K. et al., "Comprehensive Enhancement of Nanostructured Lithium-Ion Battery Cathode Materials via Conformal Graphene Dispersion", Nano Letters, Feb. 27, 2017, vol. 17, pp. 2539-2546.
Jaber-Ansari, L. et al., "Suppressing Manganese Dissolution from Lithium Manganese Oxide Spinel Cathodes with Single-Layer Graphene", Advanced Energy Materials, 2015.

(a)

(b)

| Coils | N (turns) | Inductance (uH) | Parasitic Capacitance (pF) | Resistance (Ohms) | Self-Resonance Frequency (MHz) |
|---|---|---|---|---|---|
| Transmission Coil | 1 | 0.35 | N/A | 0.1 | 350 |
| Sensor A | 18 | 18.8 | 5.6 | 2.2 | 15.4 |
| Sensor B | 22 | 33.3 | 7.1 | 3.0 | 10.3 |

| Layers | Relative Permittivity | Conductivity (S/m) | Loss Tangent |
|---|---|---|---|
| Air | 1 | 0 | 0 |
| Skin | 177.13 | 0.384 | 2.88 |
| Fat | 11.82 | 0.0303 | 3.4 |
| Muscle | 138.44 | 0.628 | 6.02 |
| Tissue | 138.44 | 0.628 | 6.02 |

WIRELESS, LCR-BASED, PASSIVE SENSOR SYSTEMS FOR IMPLANTABLE DEPLOYMENT USING COLLAPSIBLE ELECTROMECHANICS AND APPLICATIONS OF SAME

CROSS-REFERENCE TO RELATED APPLICATIONS

This PCT application claims priority to and the benefit of U.S. Provisional Patent Application Ser. No. 63/074,680, which was filed Sep. 4, 2020. The content of the application is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present invention relates generally to healthcare, and more particularly to systems and methods for wireless, LCR-based, passive sensor systems for catheter or other implantable deployment using collapsible electromechanics such as collapsible artificial valves, and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

The aortic valve, located between the left ventricle and the aorta (i.e., the main artery), is an important structure for preventing the back flow of the arterial blood into the heart. Artificial aortic valves, biocompatible single-way valves fixed at the same position, are the ultimate means to treat aortic valve dysfunction, such as aortic valve stenosis and aortic valve regurgitation: the former involves the narrowing of valve passage that reduces the blood flow, while the latter describes the leaking of the valve that causes back flow. Although rare, artificial aortic valves may fail after implantation. Typical failure modes of artificial valves include thrombosis and pannus formation. Such conditions increase the flow resistance through the valve, impede or even block the flow, leading to disastrous consequences such as patient death. Implementing the aortic valve with a status sensor to provide early indicators for such conditions is crucial for timely treatment of the patient.

As the implantation of the artificial aortic valves are life-long, the status sensor is preferred to be passive to avoid battery changing and associated surgeries. However, typical passive sensors, such as inductor-resistor-capacitor (LCR) sensors, are incompatible with this application due to the large deformation of the valve. Specifically, the implantation of the artificial valve involves a large deformation of the valve that typical sensors cannot tolerate, i.e., the reduction of the diameter from ~2.5 cm to ~0.8 cm ("collapse") to fit the valve into the aorta and the expansion of the diameter from ~0.8 cm back to ~2.5 cm ("re-expansion") as with the aortic transcatheter valve for example to fix the valve in position.

Therefore, a heretofore unaddressed need exists in the art to address the aforementioned deficiencies and inadequacies.

SUMMARY OF THE INVENTION

One of the objectives of the invention is to provide a wireless, LCR-based, passive sensor system, which may be used in detection systems and methods for a collapsible artificial valve disposed in a mammal subject to non-invasively measure the blood pressure or other fluid pressure of the mammal subject. Thus, the blood pressure may be used to detect the status of the collapsible artificial valve.

In one aspect, the invention relates to a detection system for an artificial aortic valve disposed between a left ventricle and an aorta of a mammal subject. The artificial aortic valve is configured to switch between an expanded state and a crimped state according to heartbeats of the mammal subject. In certain embodiments, the detection system includes a plurality of wireless inductor-resistor-capacitor (LCR)-based passive sensor systems, a plurality of antennas, and a computing device communicatively connected to the antennas. Each of the wireless LCR-based passive sensor systems includes: a deformable coil disposed on a surface of the artificial aortic valve, wherein the deformable coil forms an inductor-resistor; and a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject. The wireless LCR-based passive sensor systems includes a first sensor system disposed at a first side of the artificial aortic valve adjacent to the left ventricle, wherein the LCR circuit of the first sensor system has a first self-resonant frequency; and a second sensor system disposed at a second side of the artificial aortic valve adjacent to the aorta, wherein the LCR circuit of the second sensor system has a second self-resonant frequency different from the first self-resonant frequency. The antennas are respectively disposed on a skin of the mammal subject and wirelessly in communication with the deformation coils of the first and second sensor systems correspondingly, wherein the antennas is configured to measure the self-resonant frequencies of the LCR circuits of the first and second sensor systems. The computing device is configured to: calculate a first blood pressure of the mammal subject at the left ventricle based on the first self-resonant frequency measured by the antennas; calculate a second blood pressure of the mammal subject at the aorta based on the second self-resonant frequency measured by the antennas; and determine the status of the artificial aortic valve based on the first blood pressure and the second blood pressure.

In another aspect, the invention relates to a method for detecting a status of an artificial aortic valve implanted between a left ventricle and an aorta of a mammal subject. The method includes: disposing a plurality of wireless inductor-resistor-capacitor (LCR)-based passive sensor systems at different locations of the artificial aortic valve, wherein the artificial aortic valve is configured to switch between an expanded state and a crimped state according to heartbeats of the mammal subject, and each of the wireless LCR-based passive sensor systems comprises: a deformable coil disposed on a surface of the artificial aortic valve, wherein the deformable coil forms an inductor-resistor; and a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject; wherein the wireless LCR-based passive sensor systems comprise: a first sensor system disposed at a first side of the artificial aortic valve, wherein the LCR circuit of the first sensor system has a first self-resonant frequency; and a second sensor system disposed at a second side of the artificial aortic valve, wherein the LCR circuit of the second sensor system has a second self-resonant frequency different from the first self-resonant frequency; implanting the artificial aortic valve between the left ventricle and the aorta of the mammal subject, wherein the first side of the artificial aortic valve is adjacent to the left ventricle, and the second side of the artificial aortic valve is adjacent to the aorta; disposing a plurality of antennas respectively on a skin of the mammal subject, wherein the antenna are wirelessly in communication with the deformation coils of the first and second sensor systems correspondingly; measuring, by the antennas, the self-resonant frequencies of the LCR circuits of the first and second sensor systems; calculating a first blood pressure of the mammal subject at the left ventricle based on the first self-resonant frequency measured by the antennas; calculating a second blood pressure of the mammal subject at the aorta based on the second self-resonant frequency measured by the antennas; and determining the status of the artificial aortic valve based on the first blood pressure and the second blood pressure.

In one embodiment, for each of the first and second sensor systems, the self-resonant frequency f of the LCR circuit is:

$$f = \frac{1}{2\pi\sqrt{LC(p)}},$$

wherein L is an inductance of the deformable coil, p is the first blood pressure or the second blood pressure, and C(p) is a capacitance function of the capacitive pressure sensor.

In one embodiment, for each of the first and second sensor systems, the self-resonant frequency f of the LCR circuit is in a range between 300 KHz and 50 MHz.

In one embodiment, each of the antennas is located within a maximum readout distance D from the artificial aortic valve.

In one embodiment, the maximum readout distance D is 10 cm.

In one embodiment, for each of the wireless LCR-based passive sensor systems, the deformable coil is a multi-turn coil comprising a conductive metal wire; and a plurality of sleeves partially covering the conductive metal wire, wherein each of the sleeves is more rigid than the conductive metal wire, such that when the artificial aortic valve switches to the crimped state, the deformable coil deforms at locations not covered by the sleeves.

In one embodiment, when the artificial aortic valve switches to the crimped state, an additional thickness of the deformable coil of each of the first and second sensor systems added on the surface of the artificial aortic valve in the crimped state is less than 1 mm.

In one embodiment, the deformable coil of the first sensor system and the deformable coil of the second sensor system have different turns.

A further aspect relates to an artificial aortic valve having the detection system as described above implanted therein.

Yet another aspect of the disclosure relates to a detection system for a collapsible artificial valve or stent implanted in a mammal subject, which includes: a plurality of wireless inductor-resistor-capacitor (LCR)-based passive sensor systems disposed at different locations of the collapsible artificial valve or stent, wherein the collapsible artificial valve or stent is configured to switch between an expanded state and a crimped state, and each of the wireless LCR-based passive sensor systems comprises: a deformable coil disposed on a surface of the collapsible artificial valve or stent, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other; a plurality of antennas respectively disposed on a skin of the mammal subject and wirelessly in communication with the deformation coils of the wireless LCR-based passive sensor systems correspondingly, wherein each of the antennas is configured to measure the self-resonant frequency of the LCR circuit of a corresponding one of the wireless LCR-based passive sensor systems; and a computing device communicatively connected to the antennas, configured to: calculate a fluid pressure of the mammal subject at each of the locations of the collapsible artificial valve based on the self-resonant frequencies of the LCR circuits of the wireless LCR-based passive or stent sensor systems measured by the antennas; and determine the status of the collapsible artificial valve or stent based on the fluid pressure at each of the locations of the collapsible artificial valve or stent.

In one embodiment, for each of the wireless LCR-based passive sensor systems, the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

In one embodiment, for each of the wireless LCR-based passive sensor systems, the self-resonant frequency f of the LCR circuit is in a range between 300 KHz and 50 MHz.

In one embodiment, the collapsible artificial valve or stent is disposed in an arterial position of the mammal subject, the wireless LCR-based passive sensor systems are disposed at different sides of the collapsible artificial valve or stent in the arterial position, the fluid pressure is a blood pressure of the mammal subject, and the self-resonant frequencies of the LCR circuits of the wireless LCR-based passive sensor systems change in response to the collapsible artificial valve or stent switching between the expanded state and the crimped state.

In one embodiment, the collapsible artificial valve is an artificial aortic valve disposed between a left ventricle and an aorta of the mammal subject, and the wireless LCR-based passive sensor systems comprise: a first sensor system disposed at a first side of the artificial aortic valve adjacent to the left ventricle, wherein the LCR circuit of the first sensor system has a first self-resonant frequency; and a second sensor system disposed at a second side of the artificial aortic valve adjacent to the aorta, wherein the LCR circuit of the second sensor system has a second self-resonant frequency.

In one embodiment, the computing device is configured to calculate the blood pressure at the left ventricle of the mammal subject based on the first self-resonant frequency and the blood pressure at the aorta of the mammal subject based on the second self-resonant frequency, and determine a status of the artificial aortic valve based on the blood pressure at the left ventricle and the blood pressure at the aorta of the mammal subject.

In one embodiment, the collapsible artificial valve is an artificial mitral valve, an artificial tricuspid valve, or an artificial pulmonary valve.

In one embodiment, each of the antennas is located within a maximum readout distance D from the collapsible artificial valve or stent.

In one embodiment, the maximum readout distance D is 10 cm.

In one embodiment, for each of the wireless LCR-based passive sensor systems, the deformable coil is a multi-turn coil comprising: a conductive metal wire; and a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

In one embodiment, when the collapsible artificial valve or stent switches to the crimped state, an additional thickness of the deformable coil of each of the wireless LCR-based passive sensor systems added on the surface of the collapsible artificial valve or stent in the crimped state is less than 1 mm.

In one embodiment, the deformable coils of the wireless LCR-based passive sensor systems have different turns.

A further aspect relates to a collapsible artificial valve or stent having the detection system as described above implanted therein.

Yet another aspect of the disclosure relates to a method for detecting a status of a collapsible artificial valve or stent implanted in a mammal subject, which includes: disposing a plurality of wireless inductor-resistor-capacitor (LCR)-based passive sensor systems at different locations of the collapsible artificial valve or stent, wherein the collapsible artificial valve or stent is configured to switch between an expanded state and a crimped state, and each of the wireless LCR-based passive sensor systems comprises: a deformable coil disposed on a surface of the collapsible artificial valve or stent, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other; implanting the collapsible artificial valve or stent in the mammal subject; disposing a plurality of antennas respectively on a skin of the mammal subject, wherein the antenna are wirelessly in communication with the deformation coils of the wireless LCR-based passive sensor systems correspondingly; measuring, by the antennas, the self-resonant frequencies of the LCR circuits of the wireless LCR-based passive sensor systems; and determining the status of the collapsible artificial valve or stent based on a fluid pressure at each of the locations of the collapsible artificial valve or stent, wherein the fluid pressure is calculated based on the self-resonant frequencies of the LCR circuits of the wireless LCR-based passive sensor systems measured by the antennas.

In one embodiment, for each of the wireless LCR-based passive sensor systems, the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

In one embodiment, for each of the wireless LCR-based passive sensor systems, the self-resonant frequency f of the LCR circuit is in a range between 300 KHz and 50 MHz.

In one embodiment, the collapsible artificial valve or stent is disposed in an arterial position of the mammal subject, the wireless LCR-based passive sensor systems are disposed at different sides of the collapsible artificial valve or stent in the arterial position, the fluid pressure is a blood pressure of the mammal subject, and the self-resonant frequencies of the LCR circuits of the wireless LCR-based passive sensor systems change in response to the collapsible artificial valve or stent switching between the expanded state and the crimped state.

In one embodiment, the collapsible artificial valve is an artificial aortic valve disposed between a left ventricle and an aorta of the mammal subject, and the wireless LCR-based passive sensor systems comprise: a first sensor system disposed at a first side of the artificial aortic valve adjacent to the left ventricle, wherein the LCR circuit of the first sensor system has a first self-resonant frequency; and a second sensor system disposed at a second side of the artificial aortic valve adjacent to the aorta, wherein the LCR circuit of the second sensor system has a second self-resonant frequency.

In one embodiment, the status of the artificial aortic valve is determined by: calculating the blood pressure at the left ventricle of the mammal subject based on the first self-resonant frequency and the blood pressure at the aorta of the mammal subject based on the second self-resonant frequency; and determining the status of the artificial aortic valve based on the blood pressure at the left ventricle and the blood pressure at the aorta.

In one embodiment, the collapsible artificial valve is an artificial mitral valve, an artificial tricuspid valve, or an artificial pulmonary valve or stent.

In one embodiment, each of the antennas is located within a maximum readout distance D from the collapsible artificial valve.

In one embodiment, the maximum readout distance D is 10 cm.

In one embodiment, for each of the wireless LCR-based passive sensor systems, the deformable coil is a multi-turn coil comprising: a conductive metal wire; and a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

In one embodiment, when the collapsible artificial valve or stent switches to the crimped state, an additional thickness of the deformable coil of each of the wireless LCR-based passive sensor systems added on the surface of the collapsible artificial valve or stent in the crimped state is less than 1 mm.

In one embodiment, the deformable coils of the wireless LCR-based passive sensor systems have different turns.

In another aspect of the disclosure, a wireless inductor-resistor-capacitor (LCR)-based passive sensor system configured to be implanted in a mammal subject is provided. In certain embodiments, the wireless LCR-based passive sensor system includes: a deformable coil disposed on a surface of a collapsible artificial valve or stent disposed in the mammal subject, wherein the deformable coil forms an inductor-resistor; and a capacitive pressure sensor disposed in the collapsible artificial valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a fluid pressure of the mammal subject; wherein an antenna is disposed on a skin of the mammal subject and wirelessly in communication with the deformable coil, and the antenna is configured to measure the self-resonant frequency of the LCR circuit from the deformable coil; wherein the self-resonant frequency of the LCR circuit measured by the antenna is capable of being used to calculate the fluid pressure of the mammal subject.

In one embodiment, the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

In one embodiment, the self-resonant frequency f of the LCR circuit is in a range between 300 KHz and 50 MHz.

In one embodiment, the collapsible artificial valve or stent is disposed in an arterial position of the mammal subject and is configured to switch between an expanded state and a crimped state, and the fluid pressure is a blood pressure of the mammal subject at the arterial position.

In one embodiment, the antenna is located within a maximum readout distance D from the collapsible artificial valve or stent.

In one embodiment, the maximum readout distance D is 10 cm.

In one embodiment, the collapsible artificial valve is an artificial aortic valve, an artificial mitral valve, an artificial tricuspid valve, or an artificial pulmonary valve.

In one embodiment, the deformable coil is a multi-turn coil comprising: a conductive metal wire; and a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

In one embodiment, when the collapsible artificial valve or stent switches to the crimped state, an additional thickness of the deformable coil added on the surface of the collapsible artificial valve in the crimped state is less than 1 mm.

These and other aspects of the invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The following drawings form part of the present specification and are included to further demonstrate certain aspects of the invention. The invention may be better understood by reference to one or more of these drawings in combination with the detailed description of specific embodiments presented herein. The drawings described below are for illustration purposes only. The drawings are not intended to limit the scope of the present teachings in any way.

DETAILED DESCRIPTION OF THE INVENTION

Figure 1A:
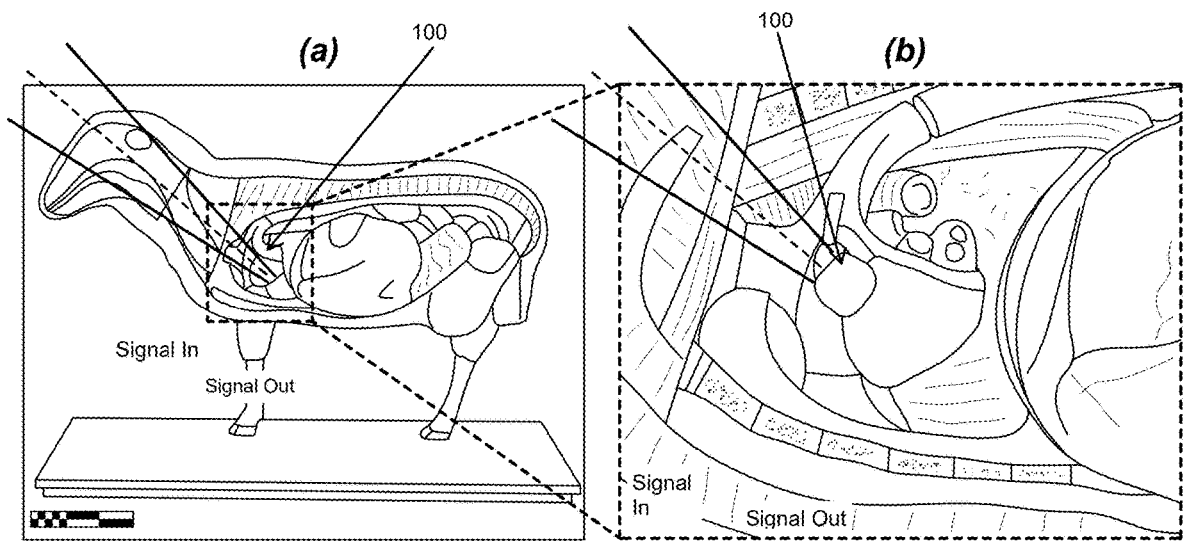
FIG. 1A schematically shows (a) a model of a sheep as a mammal subject in which a collapsible artificial aortic valve is implanted in, and (b) an enlarged view of the heart of the sheep showing the collapsible artificial aortic valve, according to certain embodiments of the present invention.

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the present invention.

It will be understood that, as used in the description herein and throughout the claims that follow, the meaning of "a", "an", and "the" includes plural reference unless the context clearly dictates otherwise. Also, it will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used in this disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in this disclosure, the phrase "at least one of A, B, and C" should be construed to mean a logical (A or B or C), using a non-exclusive logical OR. As used herein, the term "and/or" includes any and all combinations of one or more of the associated listed items.

As used in this disclosure, the term "spatially separated" refers to two different locations on skin, where the two sensor systems disposed on those locations are not in physical contact. For example, one sensor system may be on the torso, and another sensor system on the limb.

As used in this disclosure, the term "mammal subject" refers to a living human subject or a living non-human subject. For the purpose of illustration of the invention, the apparatus and method are applied to monitor and/or measure physiological parameters of neonates or infants. It should be appreciated to one skilled in the art that the apparatus can also be applied to monitor and/or measure physiological parameters of children or adults in practice the invention.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

As discussed above, typical passive sensors, such as LCR sensors, are incompatible for the artificial aortic valve due to the large deformation of the valve. To remedy the deficiency, the inventors propose an LCR-based deformable, wireless, passive sensor that can be used to measure the blood pressure (both in flow an out flow at multiple locations simultaneously) in artificial valves, such that the artificial valves may be collapsible with the use of multiple deformable passive sensors. In addition, the sensors can be placed on many different sized stents or other collapsible frames of the artificial valves for minimally invasive deployment to enable measurements in other arterial positions in the body.

In one aspect, the invention relates to a detection system for an artificial aortic valve disposed between a left ventricle and an aorta of a mammal subject. The artificial aortic valve is configured to switch between an expanded state and a crimped state according to heartbeats of the mammal subject. In certain embodiments, the detection system includes a plurality of wireless inductor-resistor-capacitor (LCR)-based passive sensor systems, a plurality of antennas, and a computing device communicatively connected to the antennas. Each of the wireless LCR-based passive sensor systems includes: a deformable coil disposed on a surface of the artificial aortic valve, wherein the deformable coil forms an inductor-resistor; and a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject. The wireless LCR-based passive sensor systems includes a first sensor system disposed at a first side of the artificial aortic valve adjacent to the left ventricle, wherein the LCR circuit of the first sensor system has a first self-resonant frequency; and a second sensor system disposed at a second side of the artificial aortic valve adjacent to the aorta, wherein the LCR circuit of the second sensor system has a second self-resonant frequency different from the first self-resonant frequency. The antennas are respectively disposed on a skin of the mammal subject and wirelessly in communication with the deformation coils of the first and second sensor systems correspondingly, wherein the antennas is configured to measure the self-resonant frequencies of the LCR circuits of the first and second sensor systems. The computing device is configured to: calculate a first blood pressure of the mammal subject at the left ventricle based on the first self-resonant frequency measured by the antennas; calculate a second blood pressure of the mammal subject at the aorta based on the second self-resonant frequency measured by the antennas; and determine the status of the artificial aortic valve based on the first blood pressure and the second blood pressure.

Another aspect of the disclosure relates to a detection system for a collapsible artificial valve or stent implanted in a mammal subject, which includes: a plurality of wireless inductor-resistor-capacitor (LCR)-based passive sensor systems disposed at different locations of the collapsible artificial valve or stent, wherein the collapsible artificial valve or stent is configured to switch between an expanded state and a crimped state, and each of the wireless LCR-based passive sensor systems comprises: a deformable coil disposed on a surface of the collapsible artificial valve or stent, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other; a plurality of antennas respectively disposed on a skin of the mammal subject and wirelessly in communication with the deformation coils of the wireless LCR-based passive sensor systems correspondingly, wherein each of the antennas is configured to measure the self-resonant frequency of the LCR circuit of a corresponding one of the wireless LCR-based passive sensor systems; and a computing device communicatively connected to the antennas, configured to: calculate a fluid pressure of the mammal subject at each of the locations of the collapsible artificial valve or stent based on the self-resonant frequencies of the LCR circuits of the wireless LCR-based passive sensor systems measured by the antennas; and determine the status of the collapsible artificial valve or stent based on the fluid pressure at each of the locations of the collapsible artificial valve or stent.

In another aspect of the disclosure, a wireless inductor-resistor-capacitor (LCR)-based passive sensor system configured to be implanted in a mammal subject is provided. In certain embodiments, the wireless LCR-based passive sensor system includes: a deformable coil disposed on a surface of a collapsible artificial valve or stent disposed in the mammal subject, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a fluid pressure of the mammal subject; wherein an antenna is disposed on a skin of the mammal subject and wirelessly in communication with the deformable coil, and the antenna is configured to measure the self-resonant frequency of the LCR circuit from the deformable coil; wherein the self-resonant frequency of the LCR circuit measured by the antenna is capable of being used to calculate the fluid pressure of the mammal subject.

Figure 1B:
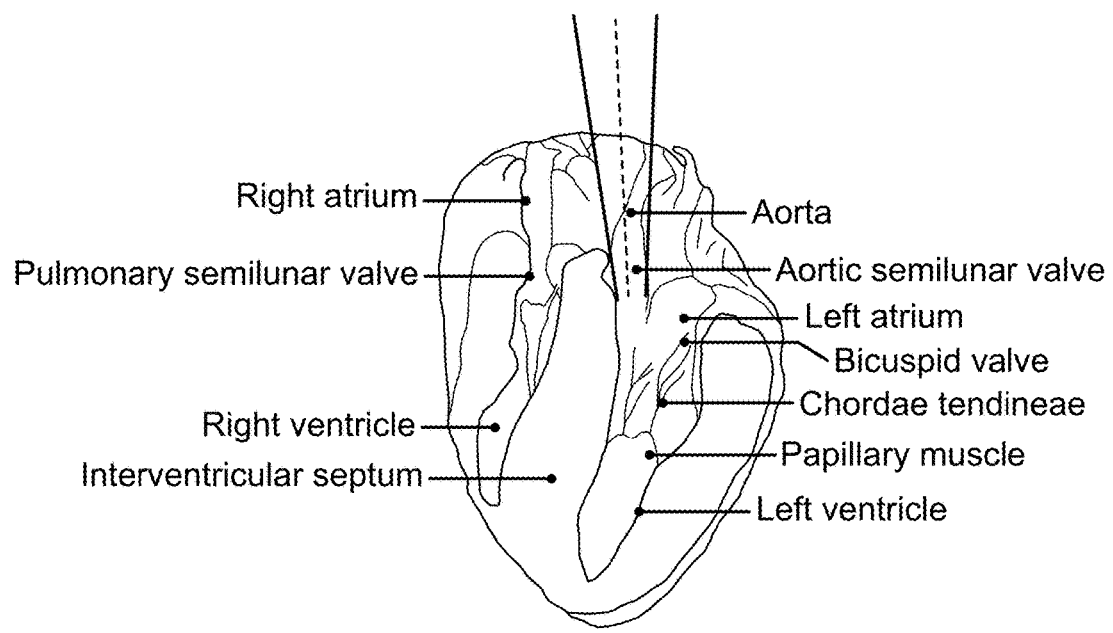
FIG. 1B schematically shows a sectional structure of the heart as shown in FIG. 1A.

FIG. 1A schematically shows (a) a model of a sheep as a mammal subject in which a collapsible artificial aortic valve is implanted in, and (b) an enlarged view of the heart of the sheep showing the collapsible artificial aortic valve, according to certain embodiments of the present invention; and FIG. 1B schematically shows a sectional structure of the heart as shown in FIG. 1A. As shown in FIGS. 1A and 1B, the mammal subject model being used is a sheep model, and the collapsible artificial aortic valve 100 is implanted between the left ventricle and the aorta (i.e., the main artery, which is illustrated in solid lines and a center line therebetween to indicate the direction of the aorta) of the sheep. The aorta of the sheep model is substantially parallel to the chest wall, such that the collapsible artificial aortic valve 100 is also in parallel to the chest wall. The detection system is implanted in the collapsible artificial aortic valve 100 to allow signals in and out. Specifically, the collapsible artificial aortic valve 100 and the detection system therein may be deployed by means of transcatheter methods. The collapsible artificial aortic valve 100 may switch between an expanded state (i.e., opening) and a crimped state (i.e., closing) according to heartbeats of the mammal subject. For the collapsible artificial aortic valve 100, the opening and closing of the valve 100 may generate characteristic periodical pressure signals (synchronized with the heartbeats of the mammal subject) in the left ventricle and the aorta, and anomalies in these pressure signals indicate malfunction of the artificial valve 100.

Figure 2A:
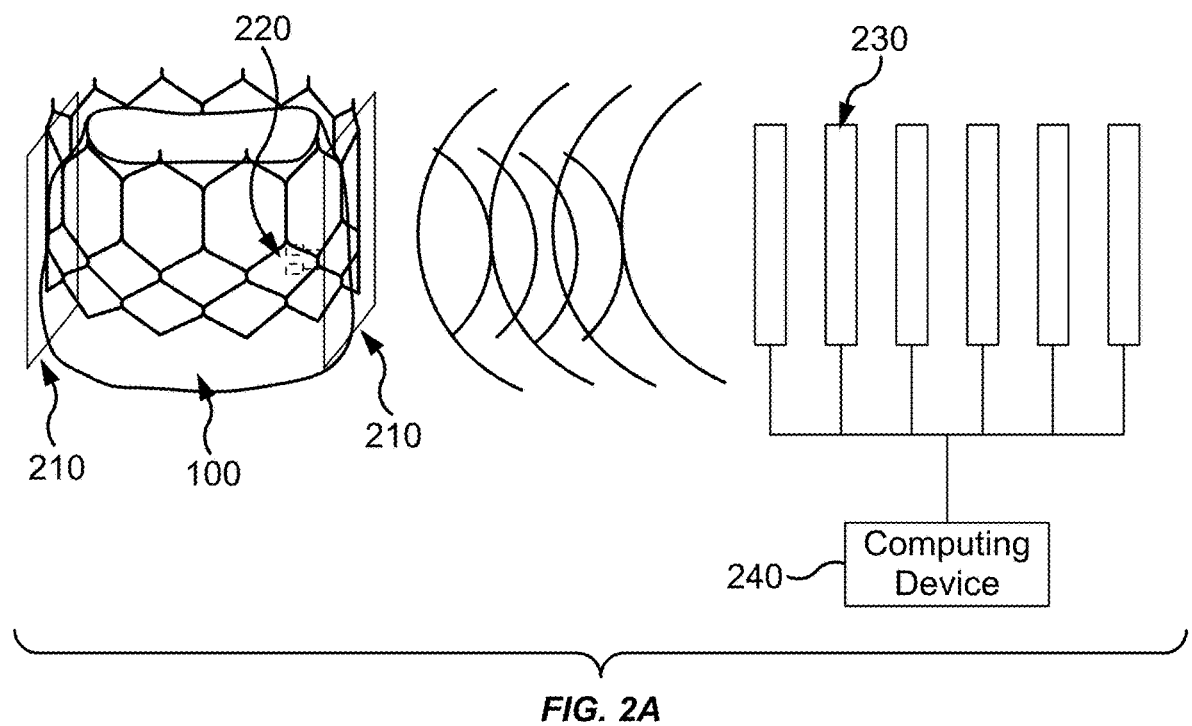
FIG. 2A schematically shows a detection system for a collapsible artificial aortic valve according to certain embodiment of the present invention.

FIG. 2A schematically shows a detection system for a collapsible artificial aortic valve according to certain embodiment of the present invention. As shown in FIG. 2A, the detection system includes a plurality of wireless LCR-based passive sensor systems disposed in the collapsible artificial aortic valve 100, a plurality of antennas 230, and a computing device 240 communicatively connected to the antennas 230. Each wireless LCR-based passive sensor systems includes: a deformable coil 210 disposed on a surface of the artificial aortic valve 100, and a capacitive pressure sensor 220 disposed in the artificial aortic valve 100. Specifically, FIG. 2A shows two sets of the wireless LCR-based passive sensor systems. In certain embodiments, the number of the wireless LCR-based passive sensor systems being provided may be customized. In each wireless LCR-based passive sensor system, the deformable coil 210 forms an inductor-resistor (L-R), and the capacitive pressure sensor 220 form a capacitor (C). Thus, the capacitive pressure sensor 220 and the deformable coil 210 collectively form an LCR circuit having a self-resonant frequency, which may be subject to change based on the blood pressure of the mammal subject. FIG. 2G schematically shows an equivalent LCR circuit of a wireless LCR-based passive sensor system as shown in FIG. 2B.

Figure 2B:
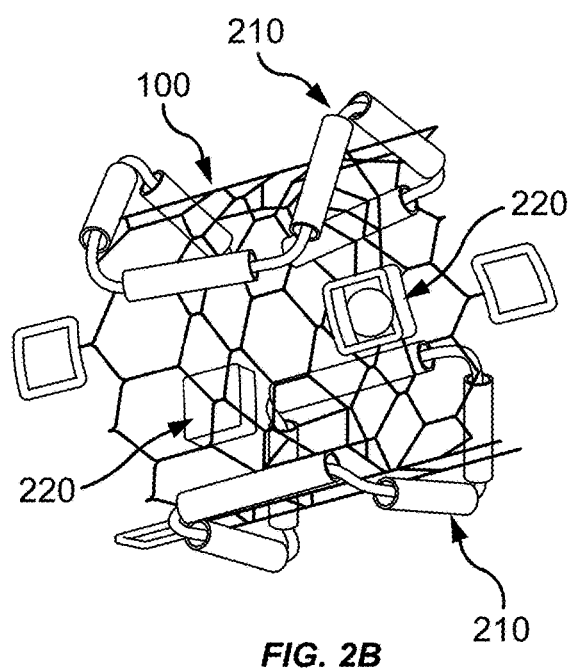
FIG. 2B shows the wireless LCR-based passive sensor systems of the detection system as shown in FIG. 2A.

FIG. 2B shows the wireless LCR-based passive sensor systems of the detection system as shown in FIG. 2A, in which only the frame of the artificial aortic valve 100 is shown. FIG. 2G shows the wireless LCR-based passive sensor systems of the detection system as shown in FIG. 2A according to another embodiment of the present invention. As shown in FIGS. 2B and 2G, the two sets of wireless LCR-based passive sensor systems includes a first sensor system disposed at a first side of the artificial aortic valve adjacent to the left ventricle, and a second sensor system disposed at a second side of the artificial aortic valve adjacent to the aorta. The LCR circuits of the first and second sensor systems have different self-resonant frequencies, allowing the signals to be simultaneously readout by the antennas 230. In other words, the LCR circuit of the first sensor system has a first self-resonant frequency, and the LCR circuit of the second sensor system has a second self-resonant frequency different from the first self-resonant frequency. FIG. 2H shows a top view of a capacitive pressure sensor of a wireless LCR-based passive sensor system as shown in FIG. 2G, showing the approximate locations of the components of the capacitive pressure sensor 220.

Figure 2C:
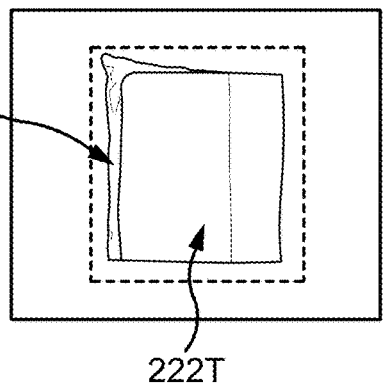
FIG. 2C shows sensor electrodes of a capacitive pressure sensor of a wireless LCR-based passive sensor system as shown in FIG. 2B.
Figure 2C:
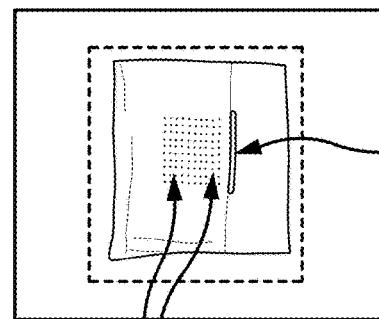
Figure 2D:
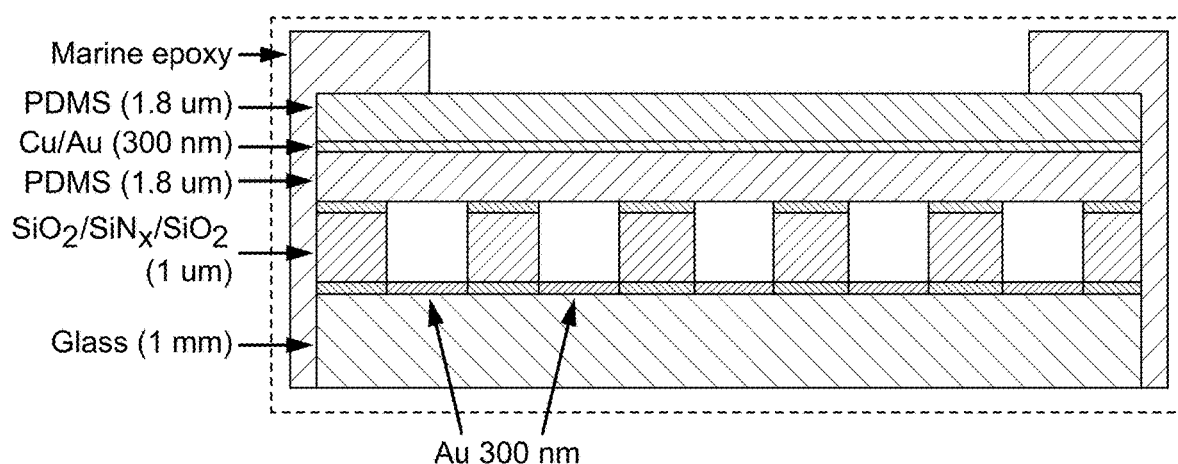
FIG. 2D shows an exemplary sectional structure of a sensor electrode as shown in FIG. 2C.

FIG. 2C shows sensor electrodes of a capacitive pressure sensor of a wireless LCR-based passive sensor system as shown in FIG. 2B. Specifically, the capacitive pressure sensor includes a plurality of miniaturized sensor electrodes electrically connected to the deformable coil in parallel. As shown in FIG. 2C, the sensor electrodes include a top sensor electrode 222T and a bottom sensor electrode 222B. The electrode structures partially overlap to allow more reliable soldering. FIG. 2D shows an exemplary sectional structure of a sensor electrode as shown in FIG. 2C. Similarly, FIG. 2I shows an exemplary sectional structure of a sensor electrode as shown in FIG. 2H. Details of the structures of the sensor electrode are not further elaborated herein.

Figure 2E:
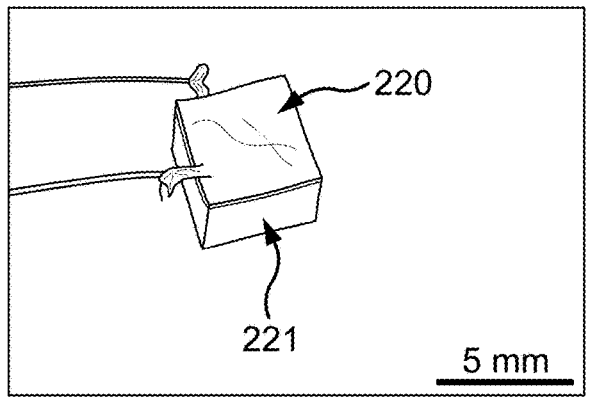
FIG. 2E shows an assembled capacitive pressure sensor of a wireless LCR-based passive sensor system as shown in FIG. 2B.
Figure 2F:
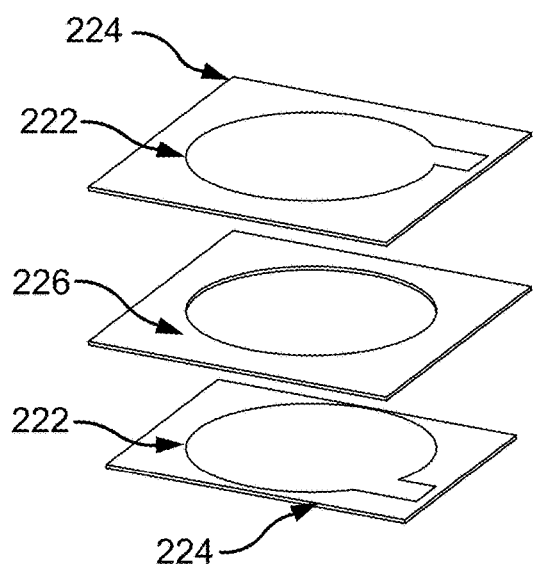
FIG. 2F shows an exploded view of the capacitive pressure sensor as shown in FIG. 2E.
Figure 2G:
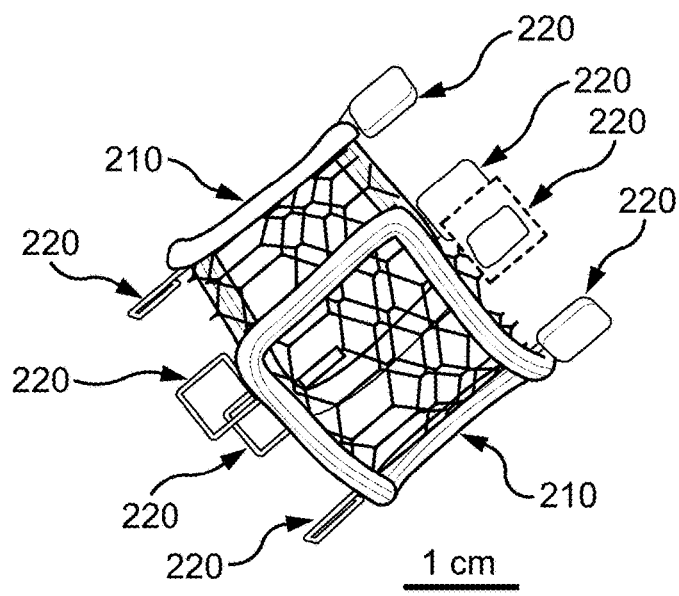
FIG. 2G shows the wireless LCR-based passive sensor systems of the detection system as shown in FIG. 2A according to another embodiment of the present invention.
Figure 2H:
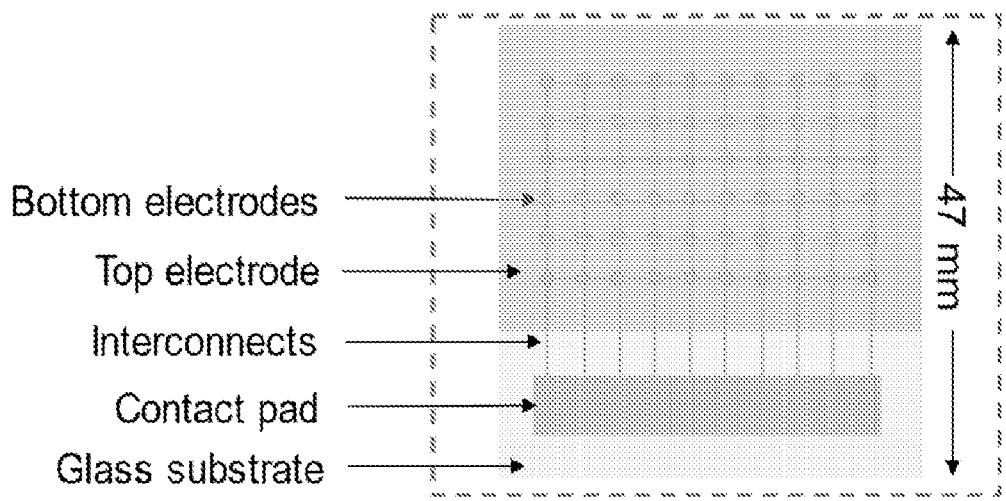
FIG. 2H shows a top view of a capacitive pressure sensor of a wireless LCR-based passive sensor system as shown in FIG. 2G.
Figure 2I:
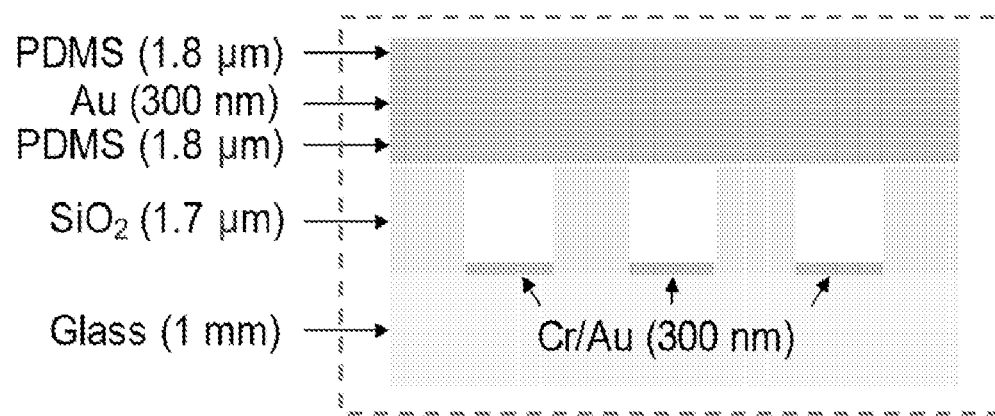
FIG. 2I shows an exemplary sectional structure of a sensor electrode as shown in FIG. 2H.

FIG. 2E shows an assembled capacitive pressure sensor of a wireless LCR-based passive sensor system as shown in FIG. 2B. As shown in FIG. 2E, the assembled sensor 220 is disposed on a substrate 221, which may be acrylic or other bio-compatible substrate material. FIG. 2F shows an exploded view of the capacitive pressure sensor as shown in FIG. 2E. As shown in FIG. 2F, the capacitive pressure sensor is formed by two sensor electrodes 222 in parallel to each other, sandwiching a spacer 226. Each sensor electrode 222 is a metal pad substantially in a circular shape, and is surrounded by an insulating layer 224. In certain embodiments, the insulating layer 224 may be formed by parylene or other insulating materials, and the spacer may be formed by polyimide or other insulating materials. In one embodiment, a diameter of the metal pad forming each sensor electrode 222 is about 3 mm. In certain embodiments, one of the two sensor electrodes 222 may be flexible to sustain the external pressure, and the distance between the sensor electrodes 222 may be determined and customized based on the external pressure.

Referring back to FIG. 2A, the antennas 230 are respectively disposed on a skin of the mammal subject and wirelessly in communication with the deformation coils 210 of the first and second sensor systems correspondingly to measure the self-resonant frequencies of the LCR circuits of the first and second sensor systems. Specifically, the antennas 230 are located on the side of the collapsible artificial aortic valve 100 to face the deformable coils 210 of the first and second sensor systems in order to maximize the coupling between the antennas 230 and the deformable coils 210. In certain embodiment, the coupling between the antennas 230 and the deformation coils 210 may be achieved by near-field coupling (NFC) or other wireless transmission/communication technology.

The computing device 240 is a computer for performing calculation of the blood pressure of the mammal subject based on the self-resonant frequency measured by the antennas 230, in order to determine the status of the artificial aortic valve based on the blood pressure calculation. In other words, the computing device 240 functions as an analyzer to obtain the blood pressure. In certain embodiments, the computing device 240 may be a general purpose computer, a specialized computer, a server, a headless computer, a mobile device such as a laptop computer, a smartphone or a tablet, a management controller, a system-on-chip (SOC), or any other types of computing device. In certain embodiments, the computing device 240 may calculate a first blood pressure of the mammal subject at the left ventricle based on the first self-resonant frequency measured by the antennas 230, calculate a second blood pressure of the mammal subject at the aorta based on the second self-resonant frequency measured by the antennas 230, and then determine the status of the artificial aortic valve 100 based on the first blood pressure and the second blood pressure. In one embodiment, for each of the first and second sensor systems, the self-resonant frequency f of the LCR circuit is:

$$f = \frac{1}{2\pi\sqrt{LC(p)}},$$

where L is an inductance of the deformable coil, p is the first blood pressure or the second blood pressure, and C(p) is a capacitance function of the capacitive pressure sensor. Thus, the self-resonant frequency f of the LCR circuit changes based on the capacitance function C(p), which is a function of the blood pressure p. In certain embodiments, for each of the first and second sensor systems, the self-resonant frequency f of the LCR circuit is in a range between 300 KHz and 50 MHz. In one embodiment, the self-resonant frequency f of the LCR circuit is in a range between 1 MHz and 20 MHz.

Figure 3A:
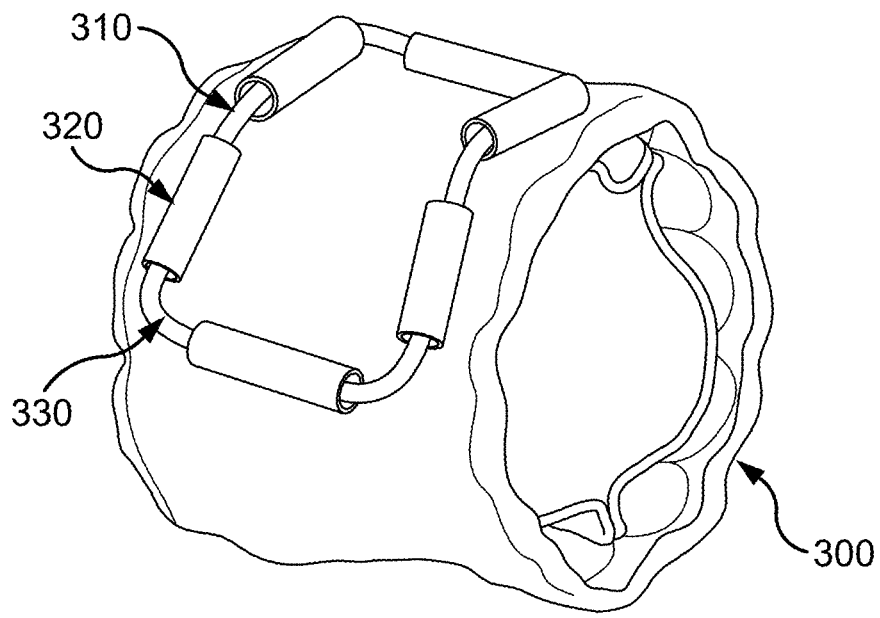
FIG. 3A shows a perspective view of a collapsible artificial aortic valve in an expanded state according to certain embodiments of the present invention.
Figure 3B:
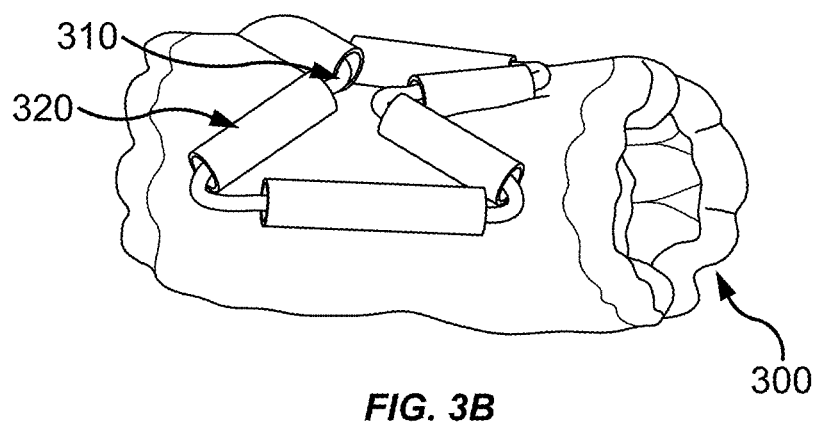
FIG. 3B shows a perspective view of the collapsible artificial aortic valve as shown in FIG. 3A switched to a crimped state.
Figure 3C:
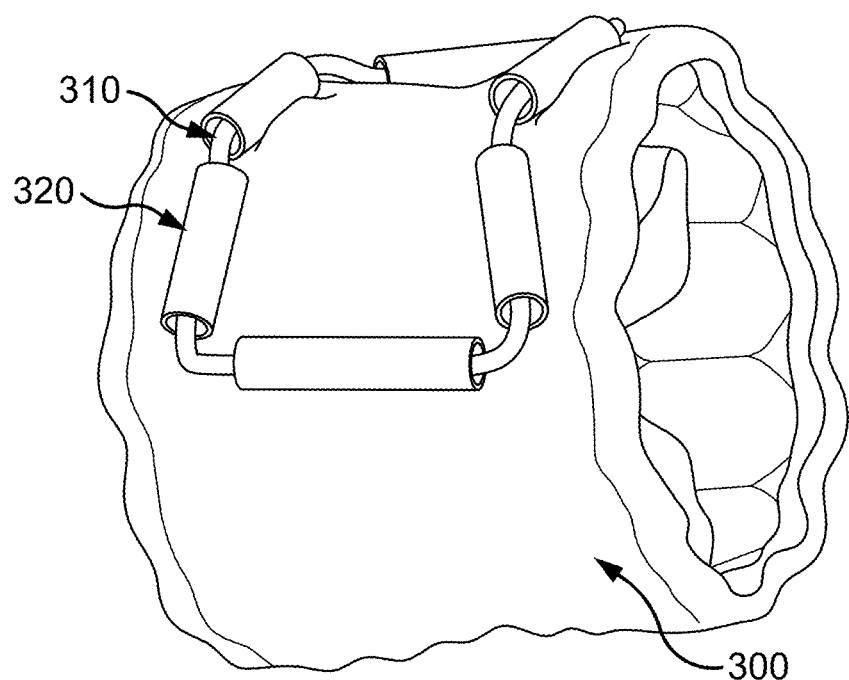
FIG. 3C shows a perspective view of the collapsible artificial aortic valve as shown in FIG. 3B returned to the expanded state.
Figure 3D:
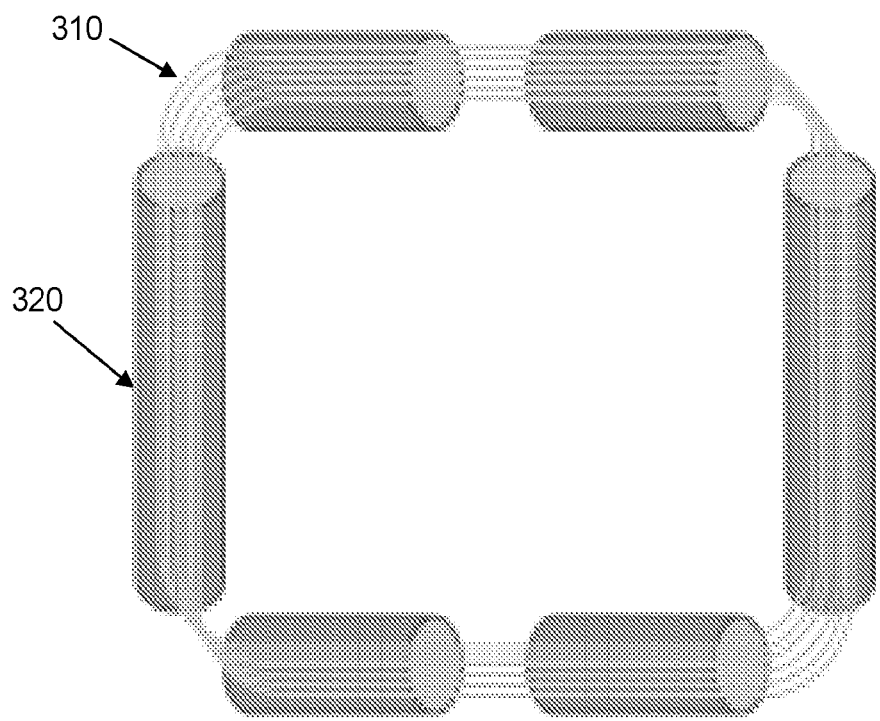
FIG. 3D schematically shows a deformable coil in an expanded state according to certain embodiments of the present invention.
Figure 3E:
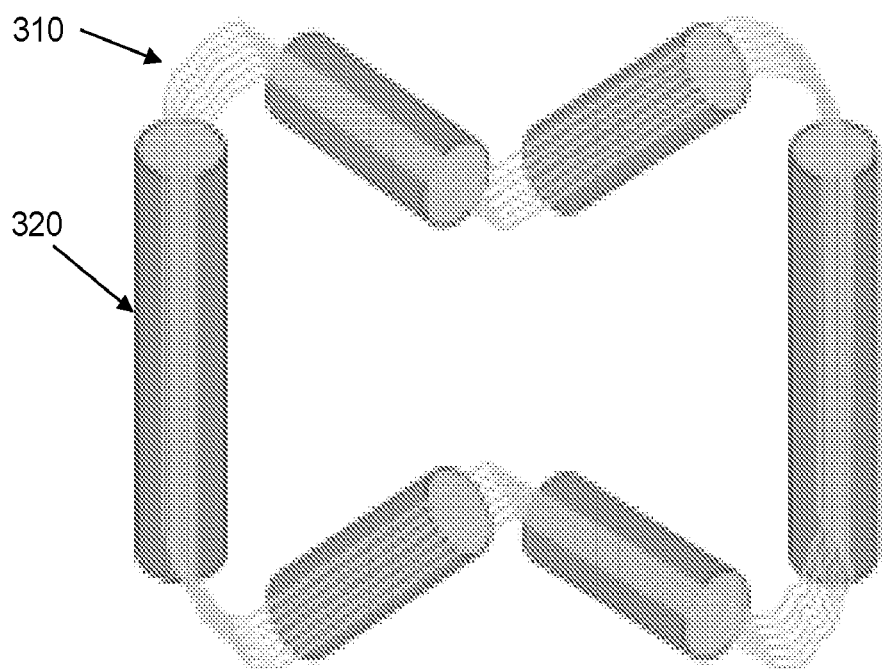
FIG. 3E schematically shows the deformable coil as shown in FIG. 3E in a crimped state.

In one embodiment, for each wireless LCR-based passive sensor system, the deformable coil may be a multi-turn coil with a specific design that allows constant collapse/expansion actions. FIGS. 3A-3C show a collapsible artificial aortic valve according to certain embodiments of the present invention. Specifically, FIG. 3A shows a perspective view of a collapsible artificial aortic valve in an expanded state; FIG. 3B shows a perspective view of the collapsible artificial aortic valve as shown in FIG. 3A switched to a crimped state; and FIG. 3C shows a perspective view of the collapsible artificial aortic valve as shown in FIG. 3B returned to the expanded state. As shown in FIG. 3A, the deformable coil disposed on the collapsible artificial aortic valve 300 includes a conductive metal wire 310 in multi-turns and coated by insulating coatings (not shown), and a plurality of sleeves 320 partially covering the conductive metal wire 310. In other words, the sleeves 320 do not cover all of the conductive metal wire 310, leaving certain portions of the conductive metal wire 310 uncovered by the sleeves 320. Further, a suture 330 is located at a corner of the deformable coil, such that the deformable coil is sutured on the substantially cylindrical surface of the valve 300. Specifically, the sleeves 320 may be formed by polymer or other insulating materials, and the modulus of the sleeves 320 may be greater than the modulus of the conductive metal wire 310. In other words, each of the sleeves 320 is more rigid than the more flexible conductive metal wire 310, such that when the artificial aortic valve 300 switches to the crimped state as shown in FIG. 3B, the deformable coil deforms at locations 310 not covered by the sleeves 320, and the strain concentrates to these uncovered part of the conductive metal wire 310. Thus, based on the customized locations of the sleeves 320, the deformable coil collapses in a controlled specific geometry to optimize the shape. FIG. 3D schematically shows a deformable coil in an expanded state according to certain embodiments of the present invention, and FIG. 3E schematically shows the deformable coil as shown in FIG.

3E in a crimped state. Upon re-expansion, the deformable coil returns to its original shape, as shown in FIG. 3C. Specifically, the collapse and the re-expansion of the valve make the coil on its surface undergoes reversible and designated, but not random, deformation. This feature allows maximization of the coil area of the the deformable coil for large wireless signal transmission distance, as the deformable coils with large areas can now endure the collapse and the re-expansion processes without affecting the performance of the sensors.

Figure 4A:
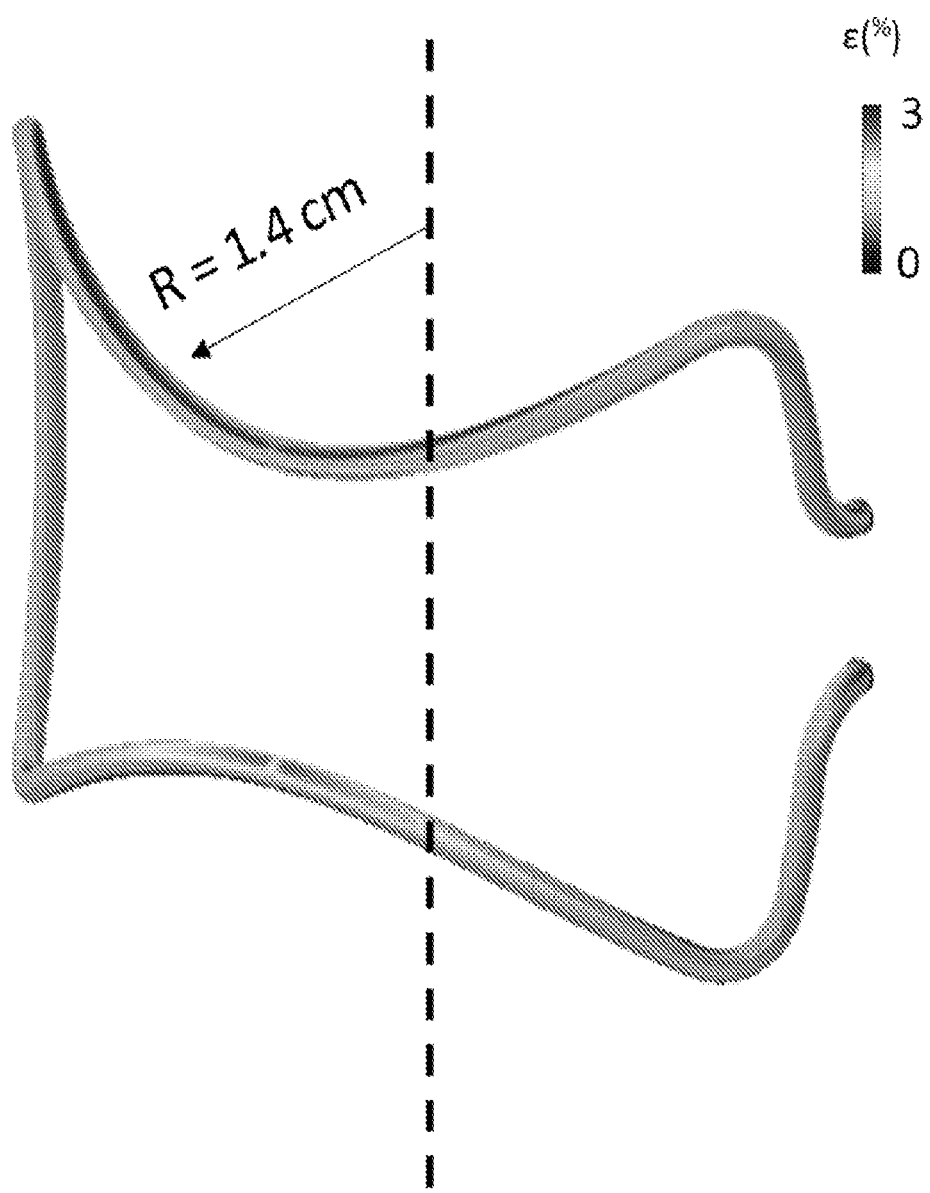
FIG. 4A shows simulation of strain of a single-turn deformable coil in a crimped state according to certain embodiments of the present invention.
Figure 4B:
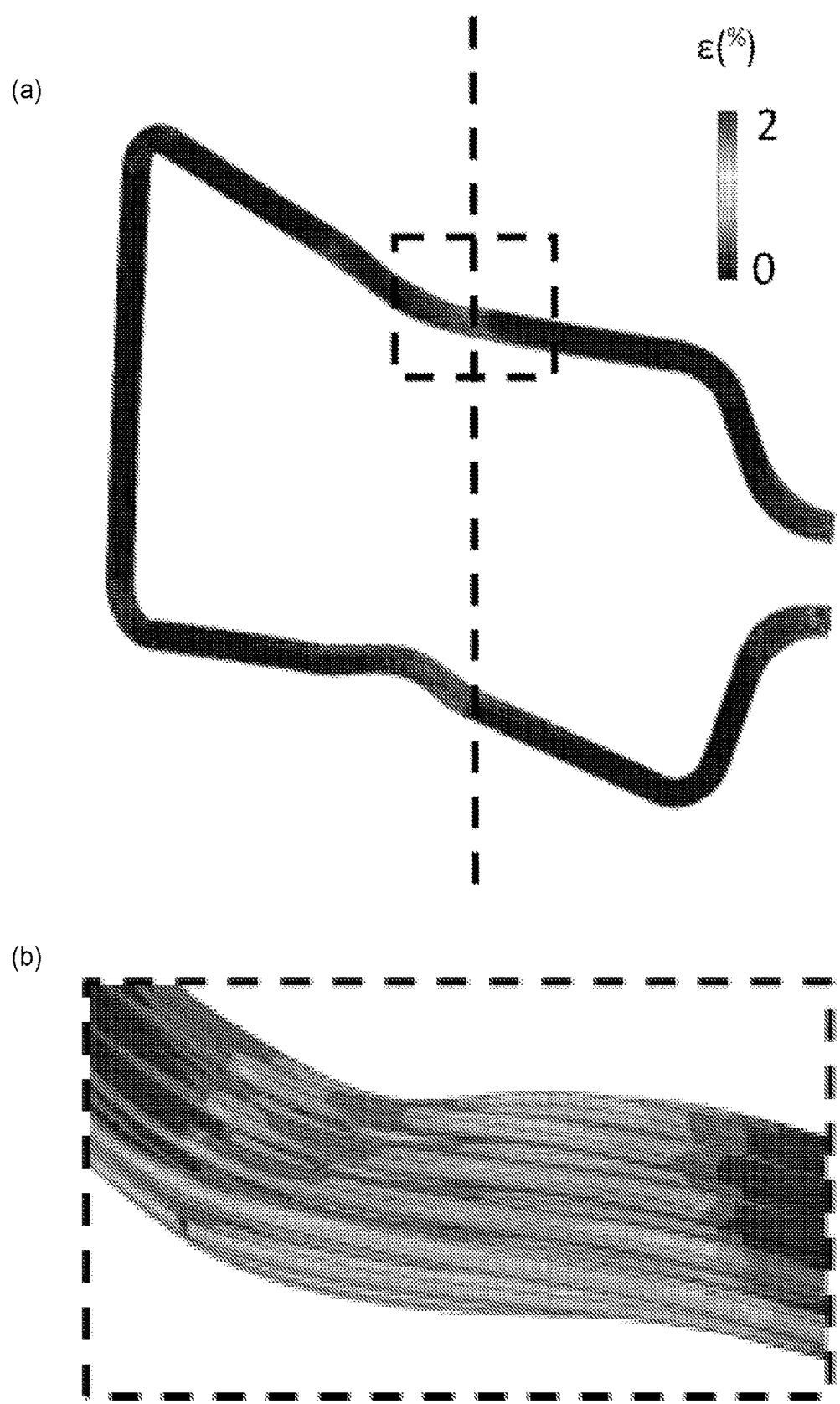
FIG. 4B shows (a) simulation of strain of a multi-turn deformable coil in a crimped state according to certain embodiments of the present invention, and (b) an enlarged view of the strain at a location where the conductive metal wire of the deformable coil is not covered by the sleeves.

The inventors have conducted simulations to show the strains of the deformable coil upon deformation. Specifically, simulations to both single-turn and multi-turn models of the deformable coil have been conducted. FIG. 4A shows simulation of strain of a single-turn deformable coil in a crimped state according to certain embodiments of the present invention, which shows the concentration of strain to the portions of the conductive metal wire not covered by the sleeves. FIG. 4B shows (a) simulation of strain of a multi-turn deformable coil in a crimped state according to certain embodiments of the present invention, and (b) an enlarged view of the strain at a location where the conductive metal wire of the deformable coil is not covered by the sleeves, showing a more significant concentration to the portions of the conductive metal wire not covered by the sleeves. Specifically, the multi-turn model is very complex, as each turn of the conductive metal wire is modeled and the number of elements (and required memory for the simulation) significantly increases for this detailed model to fully resolve the stress/strain in each single turn of the conductive metal wire for this model.

Figure 5A:
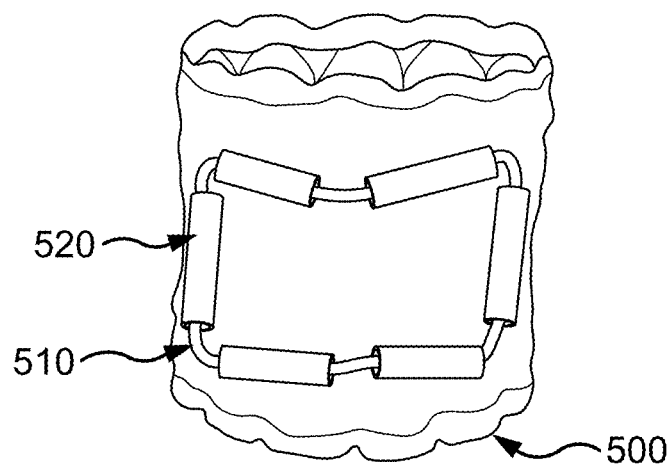
FIG. 5A shows a perspective view of a collapsible artificial aortic valve in an expanded state according to certain embodiments of the present invention.
Figure 5B:
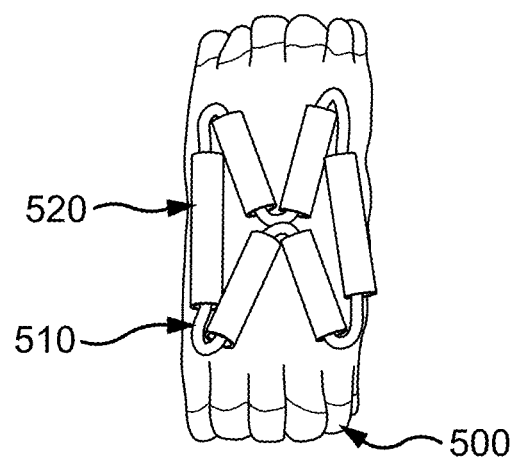
FIG. 5B shows a perspective view of the collapsible artificial aortic valve as shown in FIG. 3A switched to a crimped state.
Figure 5C:
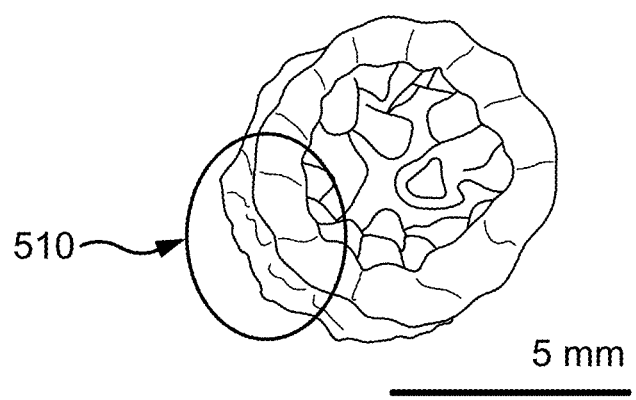
FIG. 5C schematically shows a side view of the collapsible artificial aortic valve as shown in FIG. 5B in the crimped state.
Figure 5D:
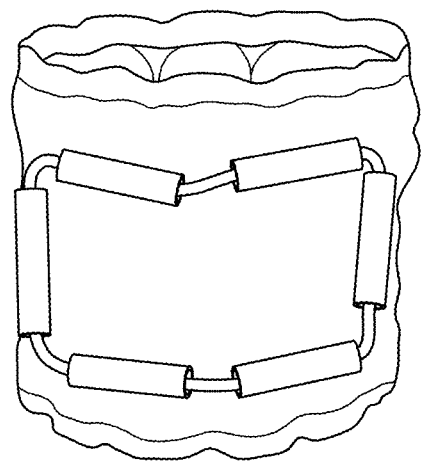
FIG. 5D shows a perspective view of the collapsible artificial aortic valve as shown in FIG. 5B returned to the expanded state.

FIG. 5A-5D show a collapsible artificial aortic valve according to a different embodiment of the present invention, which is similar to the embodiment as shown in FIGS. 3A-3C. Specifically, in this embodiment, the deformable coil disposed on the collapsible artificial aortic valve 500 includes a conductive metal wire 510 and a plurality of sleeves 520 partially covering the conductive metal wire 510. When the artificial aortic valve 500 switches to the crimped state as shown in FIGS. 5B and 5C, the deformable coil deforms at locations 510 not covered by the sleeves 520, and the strain concentrates to these uncovered part of the conductive metal wire 510. Upon re-expansion, the deformable coil returns to its original shape, as shown in FIG. 5D.

In certain embodiments, as shown in FIG. 5C, when the artificial aortic valve 500 switches to the crimped state, an additional thickness of the deformable coil is added on the surface of the artificial aortic valve 500. In one embodiment, this additional thickness is less than 1 mm. As multiple sensor systems are provided in the artificial aortic valve 500 for multiple measurement capability in different locations, the total increased thickness is not significant, thus making the artificial aortic valve 500 suitable for the implantation through artery.

Figure 5E:
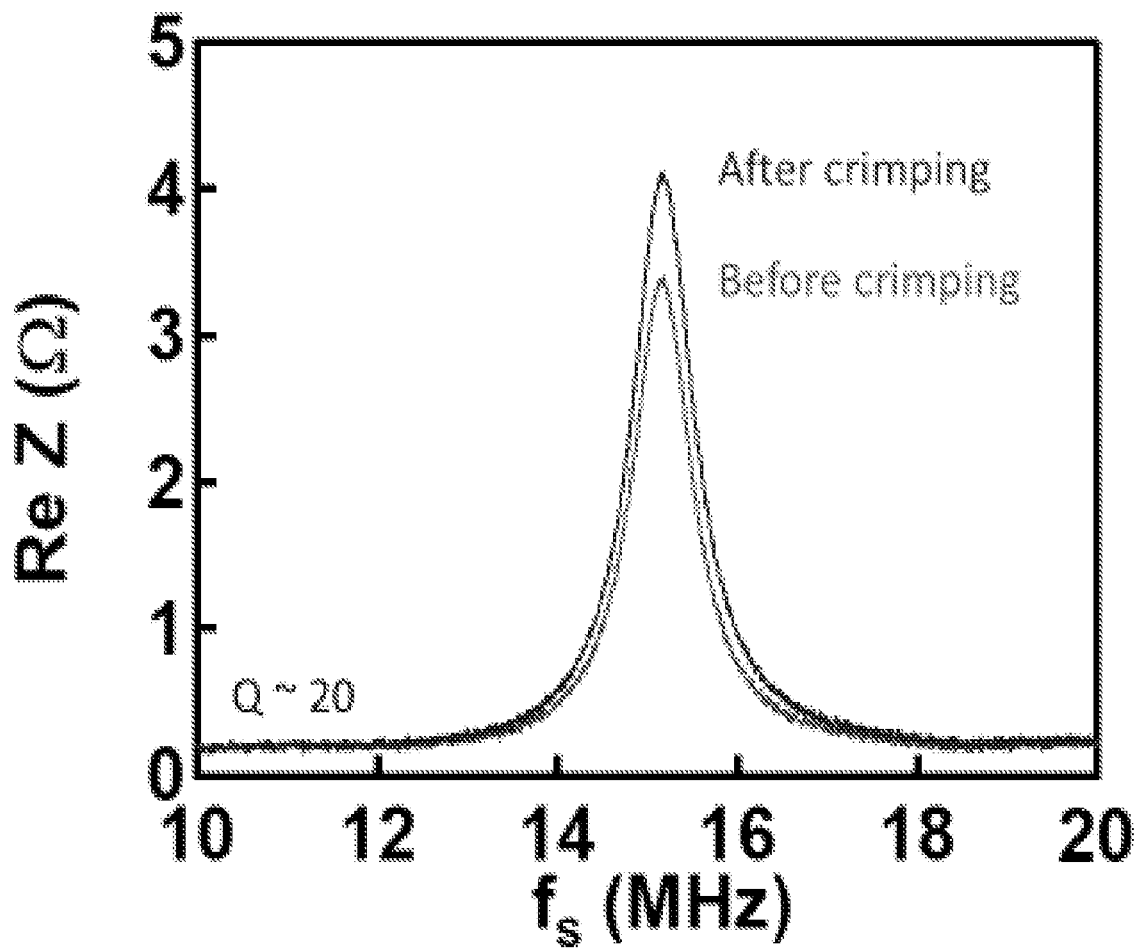
FIG. 5E shows a chart of self-resonance of the deformable coil on the surface of the collapsible artificial aortic valve as shown in FIGS. 5A-5D before and after crimped.

FIG. 5E shows a chart of self-resonance of the deformable coil on the surface of the collapsible artificial aortic valve as shown in FIGS. 5A-5D before and after crimped. Specifically, as shown in FIG. 5E, the crimping/collapse of the collapsible artificial aortic valve increases the resonance of the deformable coil. After re-expansion, the resonance of the deformable coil is nearly identical to the resonance before valve collapse, characterized by the identical Q factor ~20. The peak amplitude difference is due to the distance difference between the deformable coil and the antennas, and no difference in performance is noted.

Figure 6A:
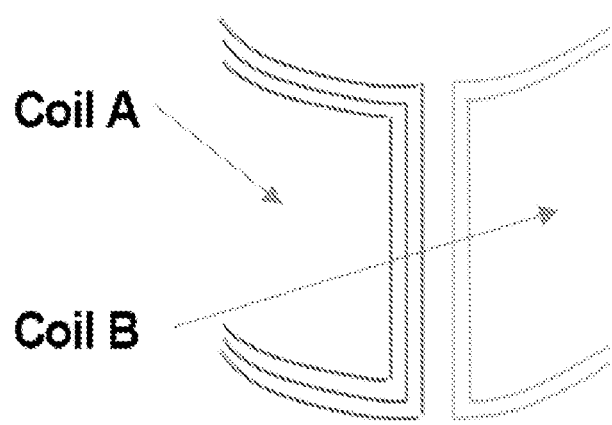
FIG. 6A schematically shows two multi-turn deformable coils having different turns on a same collapsible artificial valve according to certain embodiments of the present invention.
Figure 6B:
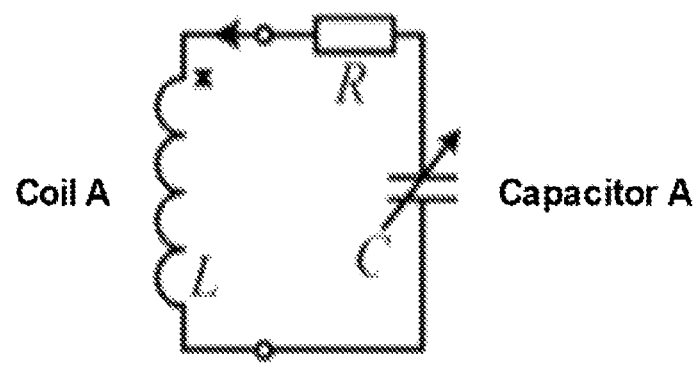
FIG. 6B schematically shows the equivalent LCR circuits of the two sensor systems having the deformation coils as shown in FIG. 6A.
Figure 6B:
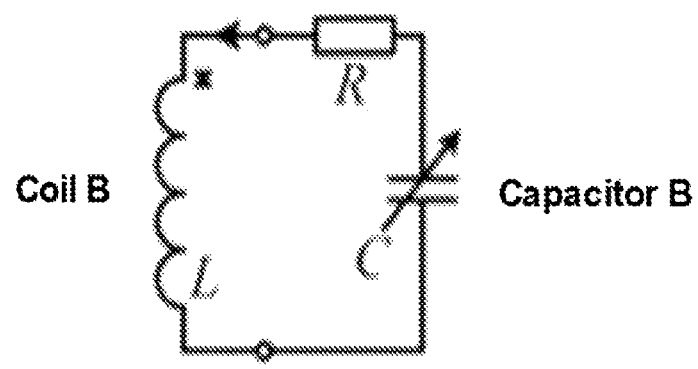

FIG. 6A schematically shows two multi-turn deformable coils having different turns on a same collapsible artificial valve according to certain embodiments of the present invention. FIG. 6B schematically shows the equivalent LCR circuits of the two sensor systems having the deformation coils as shown in FIG. 6A. As shown in FIG. 6A, the two multi-turn deformable coils A and B disposed on the cylindrical surface of the artificial valve (not shown) have different turns, thus allowing different inductances L for the two sensor systems (see FIG. 6B). Therefore, the self-resonant frequencies of the two deformable coils A and B are also different, allowing simultaneous detection of both signals of the two sensor systems in one scan. As multiple sensor systems are provided in the artificial aortic valve for multiple measurement capability in different locations, the artificial aortic valve may further give the status information for both sides of the collapsible artificial valve, which is thus more advantageous for the diagnosis of related medical conditions.

Figure 7A:
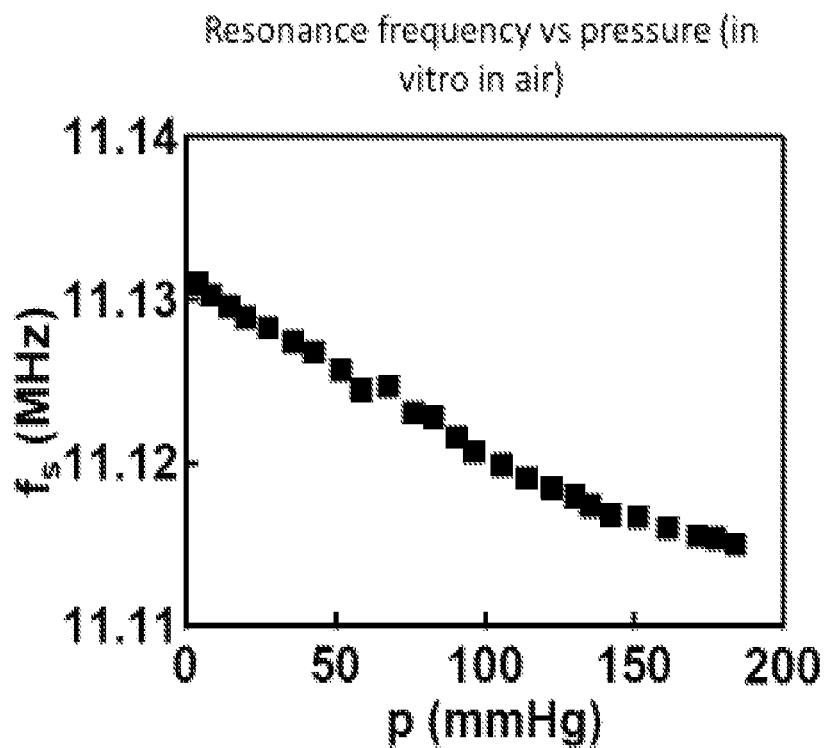
FIG. 7A shows a chart of resonance frequency to pressure for a collapsible artificial aortic valve in vitro in air according to certain embodiments of the present invention.
Figure 7B:
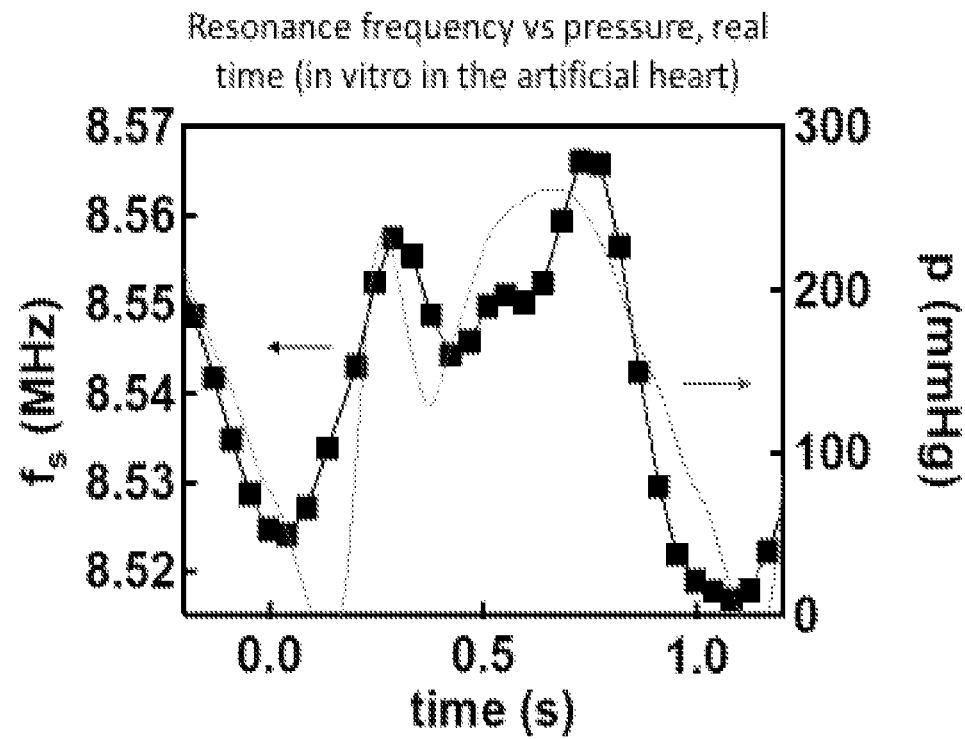
FIG. 7B shows a chart of resonance frequency to pressure for a collapsible artificial aortic valve in vitro in an artificial heart according to certain embodiments of the present invention.

The inventor has also conducted research for the resonance frequency to pressure for a collapsible artificial aortic valve according to certain embodiments of the present invention. FIG. 7A shows a chart of resonance frequency to pressure for a collapsible artificial aortic valve in vitro in air, and FIG. 7B shows a chart of resonance frequency to pressure for a collapsible artificial aortic valve in vitro in an artificial heart according to certain embodiments of the present invention. Specifically, as shown in FIG. 7A, the external pressure in air is substantially stable, and the resonance frequency is a well-defined, mostly linear function. In comparison, in the artificial heart case as shown in FIG. 7B, the period pressure provided by the pumping system (i.e., the artificial heart) is similar to a living heart of a mammal subject, and the resonance frequency being measured shows very good agreement with the pressure applied by the artificial heart.

Figure 8:
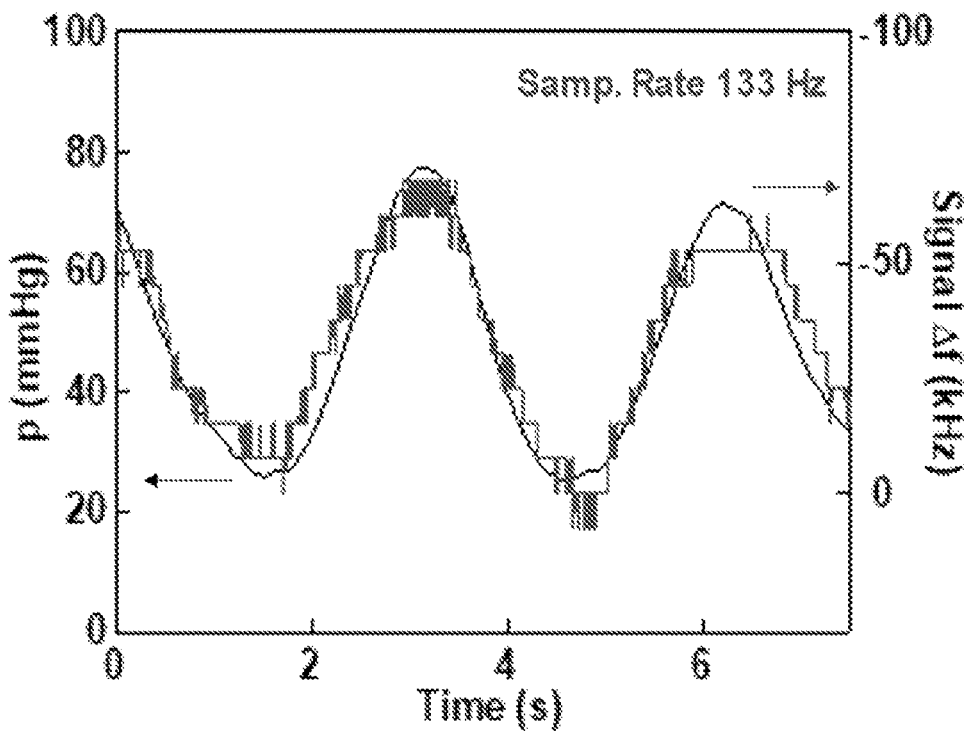
FIG. 8 shows charts of comparison of pressure measured by the detection system of a collapsible artificial aortic valve and pressure acquired by a commercial pressure sensing system in sampling rates of (a) 133 Hz and (b) 143 Hz according to certain embodiments of the present invention.
Figure 8:
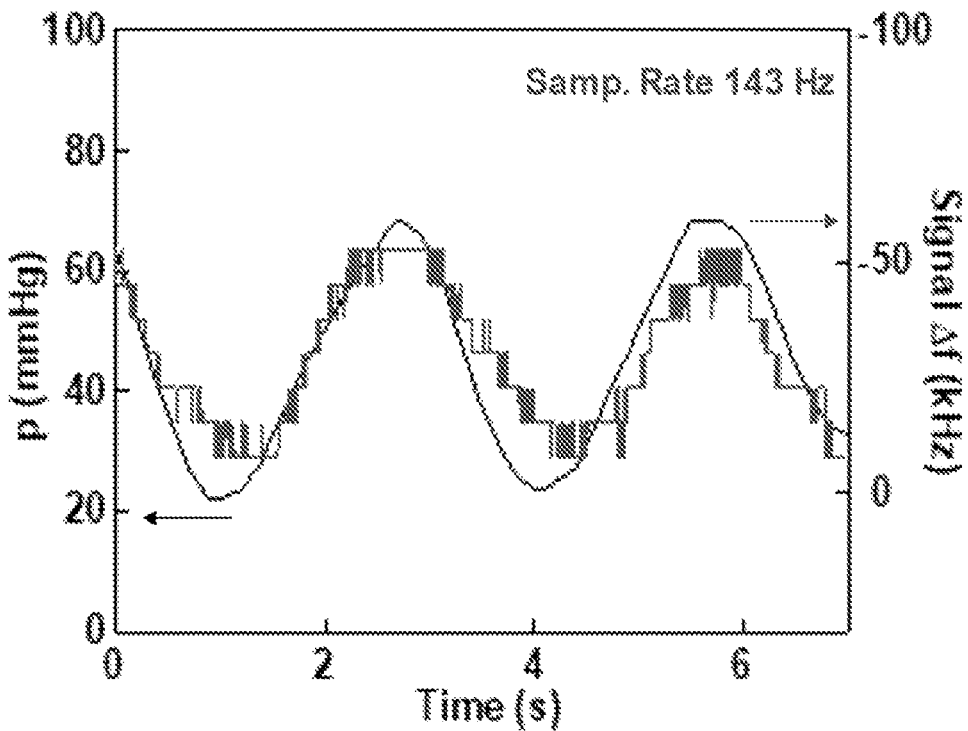

FIG. 8 shows charts of comparison of pressure measured by the detection system of a collapsible artificial aortic valve and pressure acquired by a commercial pressure sensing system in sampling rates of (a) 133 Hz and (b) 143 Hz according to certain embodiments of the present invention. As shown in FIG. 8, the resonance frequency shift measured by the detection system shows good agreement with the commercial standard and correlation of pressure fluctuations at high sampling rates. The results as shown in FIG. 8 demonstrate high sampling rate (>100 Hz) capability of the detection system.

Figure 9:
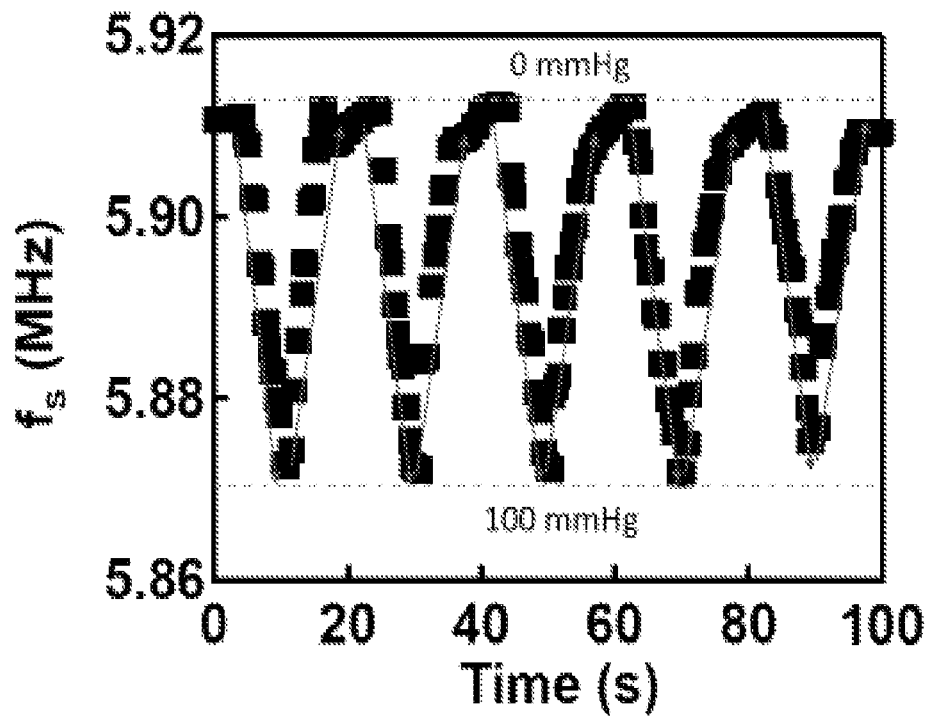
FIG. 9 shows performance of the detection system in vitro (a) in air and (b) in a pressure bumping system (PBS) according to certain embodiments of the present invention.
Figure 9:
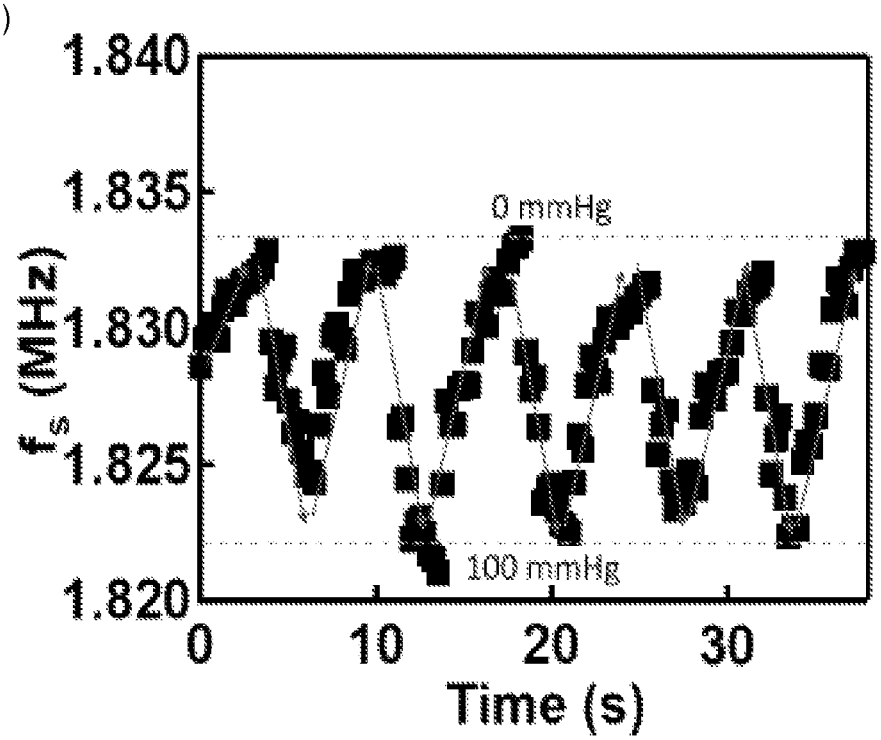

FIG. 9 shows performance of the detection system in vitro (a) in air and (b) in a pressure bumping system (PBS) according to certain embodiments of the present invention. As shown in FIG. 9, the design of the detection system is guided by the simulation work as discussed above, and the experimental results agree well with calculation. Specifically, the detection system shows instant response to pressure change and minimal drift with time in both cases. In the PBS case, the result shows lowered frequency and slightly lower relate sensitivity compared to the in-air case, both due to the parasitic capacitance of the inductor enhanced by the dielectric constant of water (which is fixable by encapsulating the deformable coils).

In the embodiments as discussed above, the detection system is implanted in collapsible artificial aortic valves to detect the blood pressure of the mammal subject. However, other types of collapsible artificial valves or stents may be used. For example, in certain embodiments, the collapsible artificial valve may be an artificial mitral valve, an artificial tricuspid valve, an artificial pulmonary valve, or other types of artificial valves implanted in an arterial location of the mammal subject. Further, the detection system is not limited to detect the blood pressure, as fluid pressures of other bodily fluid and/or fluid injected into the mammal subject may be measured.

In another aspect, the invention relates to a method for detecting a status of an artificial aortic valve implanted between a left ventricle and an aorta of a mammal subject. The method includes: disposing a plurality of wireless inductor-resistor-capacitor (LCR)-based passive sensor systems at different locations of the artificial aortic valve, wherein the artificial aortic valve is configured to switch between an expanded state and a crimped state according to heartbeats of the mammal subject, and each of the wireless LCR-based passive sensor systems comprises: a deformable coil disposed on a surface of the artificial aortic valve, wherein the deformable coil forms an inductor-resistor; and a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject; wherein the wireless LCR-based passive sensor systems comprise: a first sensor system disposed at a first side of the artificial aortic valve, wherein the LCR circuit of the first sensor system has a first self-resonant frequency; and a second sensor system disposed at a second side of the artificial aortic valve, wherein the LCR circuit of the second sensor system has a second self-resonant frequency different from the first self-resonant frequency; implanting the artificial aortic valve between the left ventricle and the aorta of the mammal subject, wherein the first side of the artificial aortic valve is adjacent to the left ventricle, and the second side of the artificial aortic valve is adjacent to the aorta; disposing a plurality of antennas respectively on a skin of the mammal subject, wherein the antenna are wirelessly in communication with the deformation coils of the first and second sensor systems correspondingly; measuring, by the antennas, the self-resonant frequencies of the LCR circuits of the first and second sensor systems; calculating a first blood pressure of the mammal subject at the left ventricle based on the first self-resonant frequency measured by the antennas; calculating a second blood pressure of the mammal subject at the aorta based on the second self-resonant frequency measured by the antennas; and determining the status of the artificial aortic valve based on the first blood pressure and the second blood pressure.

Yet another aspect of the disclosure relates to a method for detecting a status of a collapsible artificial valve or stent implanted in a mammal subject, which includes: disposing a plurality of wireless inductor-resistor-capacitor (LCR)-based passive sensor systems at different locations of the collapsible artificial valve or stent, wherein the collapsible artificial valve or stent is configured to switch between an expanded state and a crimped state, and each of the wireless LCR-based passive sensor systems comprises: a deformable coil disposed on a surface of the collapsible artificial valve or stent, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other; implanting the collapsible artificial valve or stent in the mammal subject; disposing a plurality of antennas respectively on a skin of the mammal subject, wherein the antenna are wirelessly in communication with the deformation coils of the wireless LCR-based passive sensor systems correspondingly; measuring, by the antennas, the self-resonant frequencies of the LCR circuits of the wireless LCR-based passive sensor systems; and determining the status of the collapsible artificial valve or stent based on a fluid pressure at each of the locations of the collapsible artificial valve or stent, wherein the fluid pressure is calculated based on the self-resonant frequencies of the LCR circuits of the wireless LCR-based passive sensor systems measured by the antennas.

Figure 10:
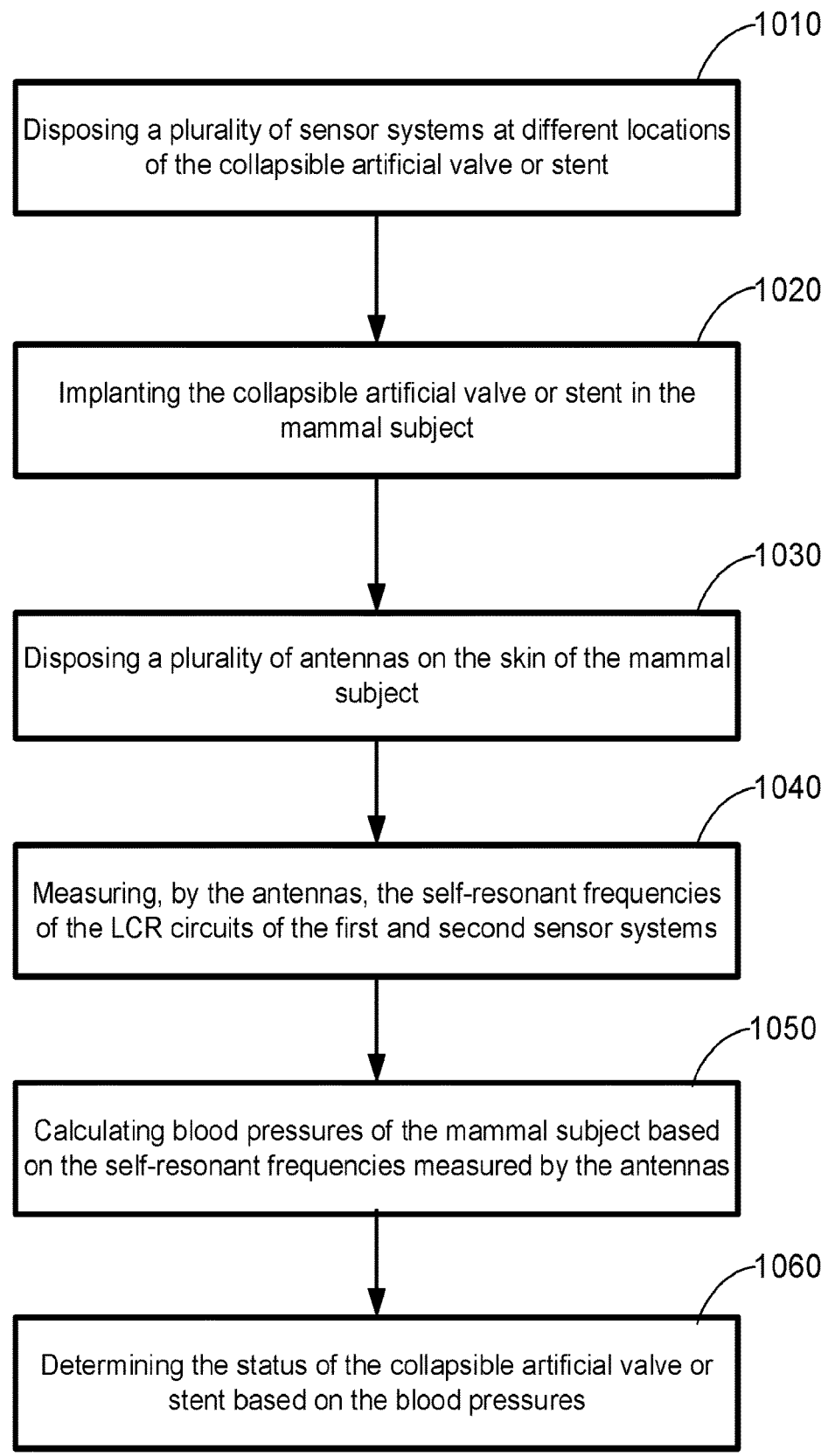
FIG. 10 shows a method for detecting a status of a collapsible artificial valve implanted in a mammal subject according to certain embodiments of the present invention.

FIG. 10 shows a method for detecting a status of a collapsible artificial valve implanted in a mammal subject according to certain embodiments of the present invention. In certain embodiments, the method as shown in FIG. 10 may be implemented on the detection systems as discussed above. It should be particularly noted that, unless otherwise stated in the disclosure, the steps of the method may be arranged in a different sequential order, and are thus not limited to the sequential order as shown in FIG. 10.

As shown in FIG. 10, at procedure 1010, a plurality of wireless LCR-based passive sensor systems are disposed at different locations of the collapsible artificial valve or stent. In certain embodiment, the collapsible artificial valve may be an artificial aortic valve, an artificial mitral valve, an artificial tricuspid valve, or an artificial pulmonary valve. Specifically, the collapsible artificial valve or stent may switch between an expanded state and a crimped state. Each of the wireless LCR-based passive sensor systems includes a deformable coil disposed on a surface of the collapsible artificial valve to form an inductor-resistor, and a capacitive pressure sensor disposed in the collapsible artificial valve to form a capacitor. The capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other. In the case of the artificial aortic valve, which is to be disposed between a left ventricle and an aorta of the mammal subject, the wireless LCR-based passive sensor systems include: a first sensor system disposed at a first side of the artificial aortic valve adjacent to the left ventricle, and a second sensor system disposed at a second side of the artificial aortic valve adjacent to the aorta. The LCR circuit of the first sensor system has a first self-resonant frequency, and the LCR circuit of the second sensor system has a second self-resonant frequency.

At procedure 1020, the collapsible artificial valve is implanted in the mammal subject. Specifically, in one embodiment, the collapsible artificial valve is disposed in an arterial position of the mammal subject, and the wireless LCR-based passive sensor systems are disposed at different sides of the collapsible artificial valve in the arterial position.

At procedure 1030, a plurality of antennas are respectively disposed on a skin of the mammal subject, such that the antenna are wirelessly in communication with the deformation coils of the wireless LCR-based passive sensor systems correspondingly.

At procedure 1040, the antennas are used to measure the self-resonant frequencies of the LCR circuits of the wireless LCR-based passive sensor systems. In one embodiment, for each of the wireless LCR-based passive sensor systems, the self-resonant frequency f of the LCR circuit is:

$$f = \frac{1}{2\pi\sqrt{LC(p)}},$$

where L is an inductance of the deformable coil, p is the fluid pressure of the mammal subject, and C(p) is a capacitance function of the capacitive pressure sensor. In certain embodiments, for each of the wireless LCR-based passive sensor systems, the self-resonant frequency f of the LCR circuit is in a range between 300 KHz and 50 MHz. In one embodiment, the self-resonant frequency f of the LCR circuit is in a range between 1 MHz and 20 MHz.

At procedure 1050, the blood pressure(s) of the mammal subject are calculated based on the self-resonant frequencies of the LCR circuits of the wireless LCR-based passive sensor systems measured by the antennas. In the case of the artificial aortic valve, a first blood pressure of the mammal subject at the left ventricle is calculated based on the first self-resonant frequency measured by the antennas, and a second blood pressure of the mammal subject at the aorta is calculated based on the second self-resonant frequency measured by the antennas.

At procedure 1060, the status of the collapsible artificial valve is determined based on the blood pressure(s).

These and other aspects of the present invention are further described below. Without intent to limit the scope of the invention, examples according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Figures 11A, 11B:
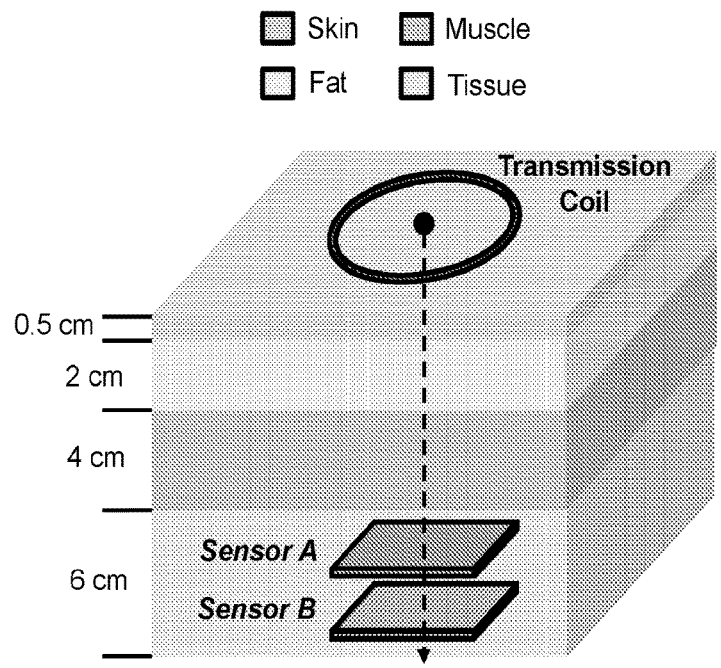
FIG. 11A shows a tissue model system with sensors and a transmission coil disposed therein according to certain embodiments of the present invention.
FIG. 11B shows a table of electromagnetic parameters of the transmission coil and the sensors as shown in FIG. 11A.

The inventors have conducted experiments to the detection system as discussed above using multiple sensor systems (hereinafter the "sensor) with different self-resonant frequencies and a single-turn transmission coil as an antenna, in order to determine the optimized design parameters of the detection system. Specifically, FIG. 11A shows a tissue model with sensors and a transmission coil disposed therein according to certain embodiments of the present invention, and FIG. 11B shows a table of electromagnetic parameters of the transmission coil and the sensors as shown in FIG. 11A. The tissue model is disposed on a valve, which is similar to the collapsible artificial valve as discussed above. As shown in FIGS. 11A and 11B, the transmission coil is a single-turn coil, and the sensors A and B have different turns (18 turns for sensor A and 22 turns for sensor B) and different self-resonance frequency (15.4 MHz for sensor A and 10.3 MHz for sensor B). During the operation, the sensors A and B expand/contract due to the collapse/re-expansion of the valve, resulting in self-resonant frequency changes that can be observed by impedance measurements Re|Z| in the transmission coil. Further, the transmission coil (i.e., the antenna) is located within a maximum readout distance D from the collapsible artificial valve. In one embodiment, the maximum readout distance D is approximately 10 cm, which will be discussed later.

Figure 12:
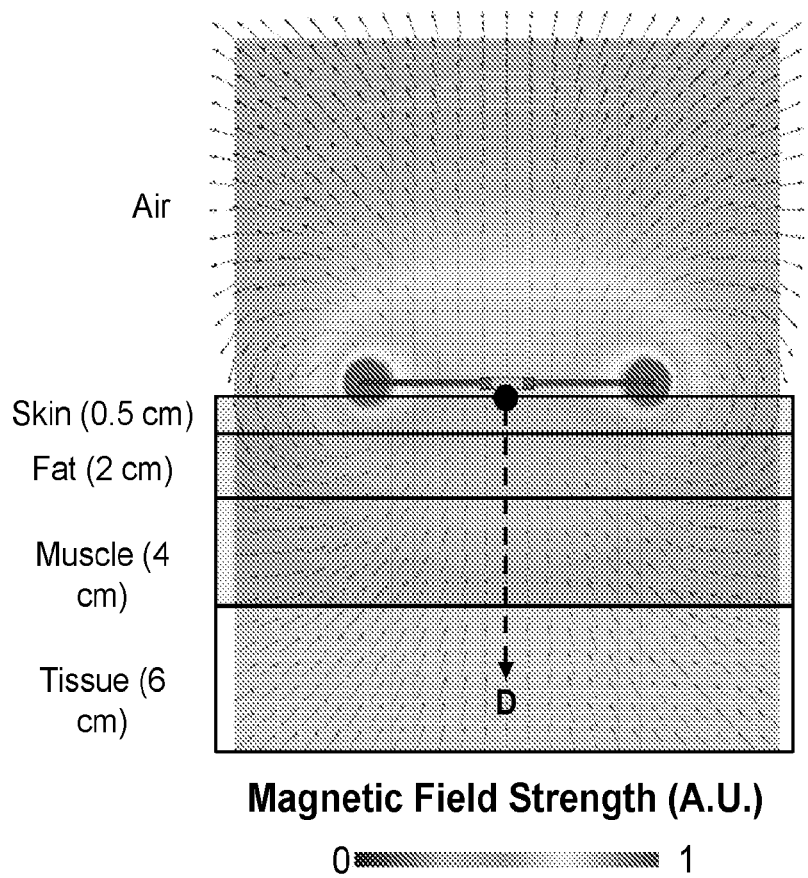
FIG. 12 shows the magnetic field strength of the tissue model system as shown in FIG. 11A.

FIG. 12 shows the magnetic field strength of the tissue model as shown in FIG. 11A. Specifically, FIG. 12 shows the magnetic field strength of the transmission coil with a 13.5 cm diameter. The transmission coil geometry can be designed based on the equation below:

$$D = \sqrt{\left(\frac{\pi\mu_0 f N_T N_R SQV_T a^2}{RV_0}\right)^{2/3} - a^2}$$

where $\mu_0$ is the permeability of free space, f is the working frequency, $N_T$, R, and a are the turns number, resistance, and radius of the transmission antenna, respectively, $N_R$, S, and Q are the turn number, area, and quality factor of the sensors, respectively, and $V_T$ is the transmitting voltage. In the model system, f is fixed at ~12-17 MHz to avoid the losses associated with absorption by biofluids. Therefore, for the fixed a, there is a need to increase $N_T$, $N_R$, S, Q, and $V_T$, but decrease R to improve the working range Z.

Figure 13:
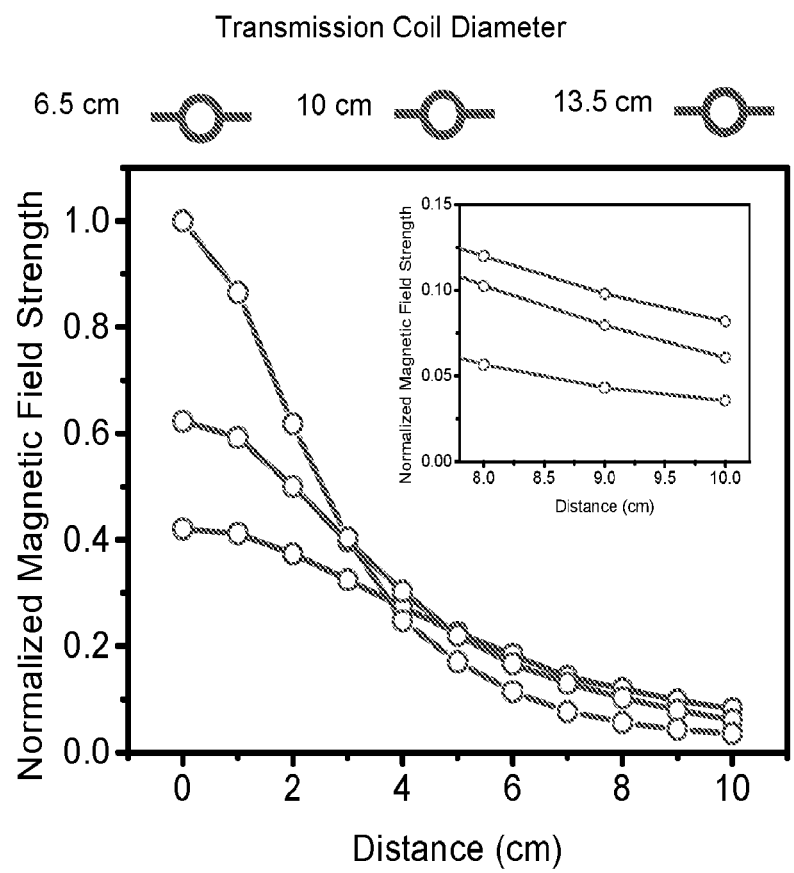
FIG. 13 shows a chart of the normalized magnetic field strength to distance of the tissue model system as shown in FIG. 11A, with the transmission coils having different diameters.

FIG. 13 shows a chart of the normalized magnetic field strength to distance of the tissue model system as shown in FIG. 11A, with the transmission coils having different diameters. As shown in FIG. 13, for distances above 5 cm, a transmission coil with a larger diameter is preferred (13.5 cm). Further, the normalized magnetic field strength as a function of distance where the transmission coil with the largest diameter has a higher magnetic field strength between 5-10 cm.

Figures 14A, 14B:
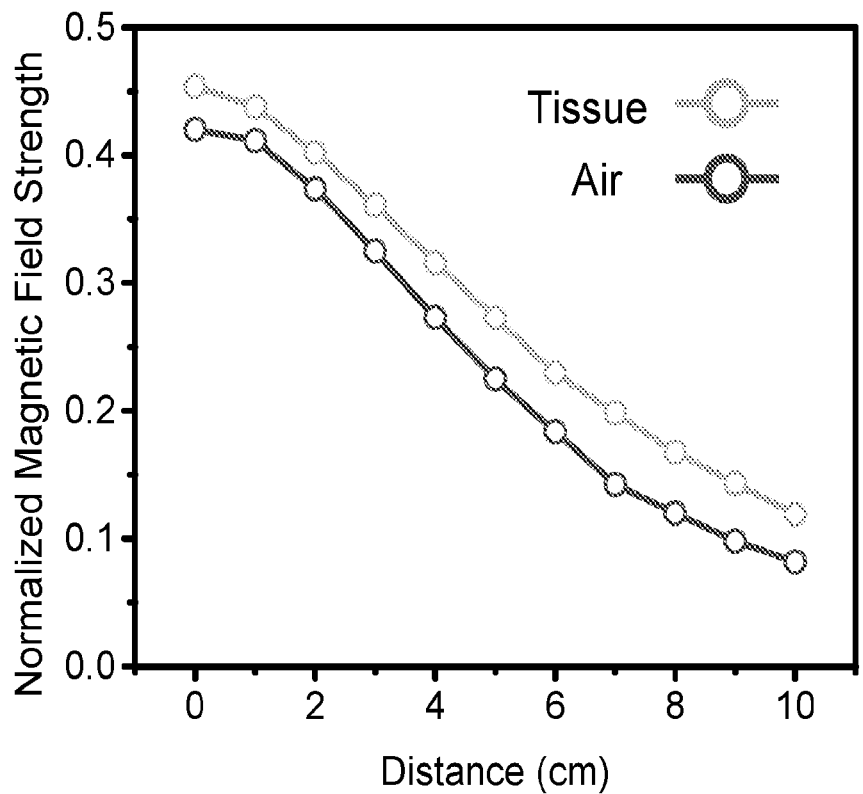
FIG. 14A shows a chart of the normalized magnetic field strength to distance of the tissue model system in tissue and in air as shown in FIG. 11A.
FIG. 14B shows a table of the electromagnetic properties of tissues and air as shown in FIG. 11A.

FIG. 14A shows a chart of the normalized magnetic field strength to distance of the tissue model system in tissue and in air as shown in FIG. 11A, and FIG. 14B shows a table of the electromagnetic properties of tissues and air as shown in FIG. 11A, As shown in FIGS. 14A and 14B, the influence of the tissues (properties in Table 2) was simulated for the transmission coil with 13.5 cm diameter where. At 10 cm, the normalized magnetic field strength increases ~30% in the tissue layers as compared to air.

Figure 15A:
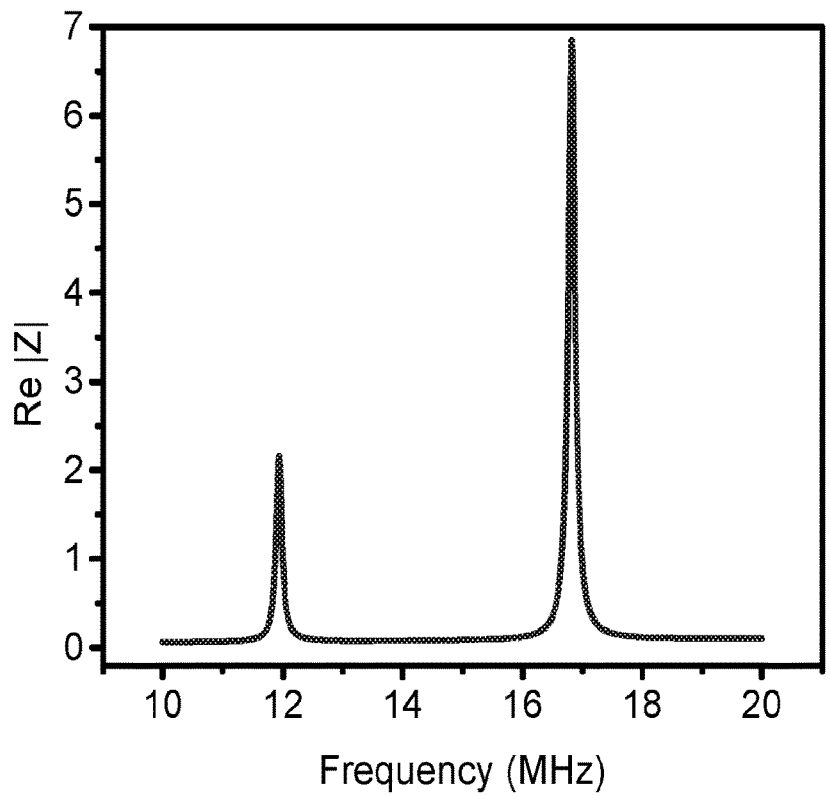
FIG. 15A shows a chart of impedance measurements to frequency of the transmission coil as shown in FIG. 11A.
Figure 15B:
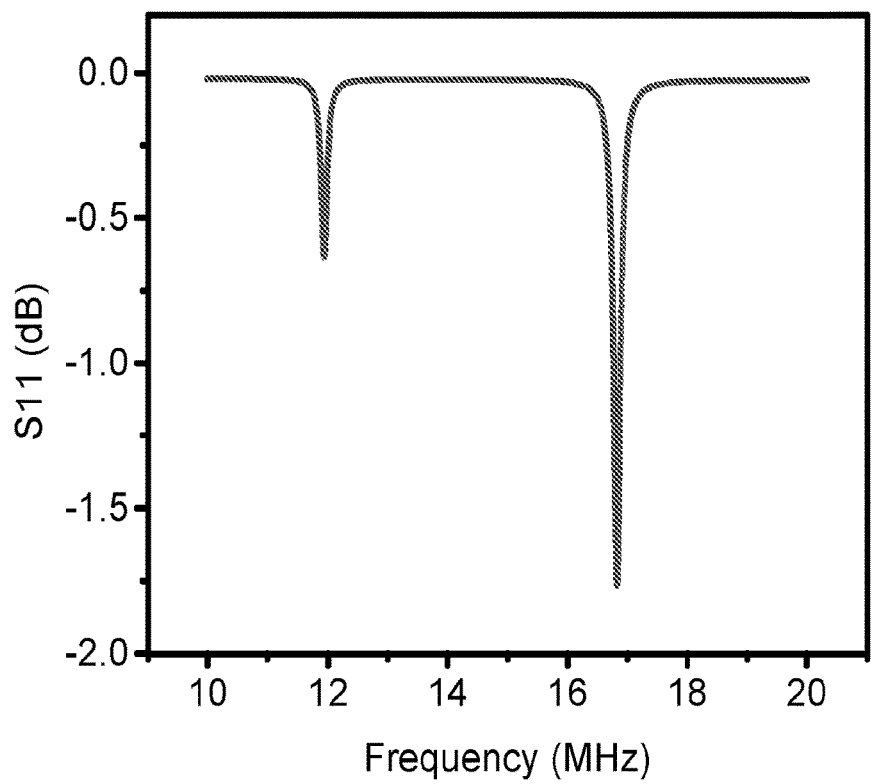
FIG. 15B shows a chart of the S11 parameters to frequency of the transmission coil as shown in FIG. 11A.

FIG. 15A shows a chart of impedance measurements to frequency of the transmission coil as shown in FIG. 11A, and FIG. 15B shows a chart of the S11 parameters to frequency of the transmission coil as shown in FIG. 11A. As shown in FIGS. 15A and 15B, the readout range can be computed from the impedance Re |Z| of the transmission coil (FIG. 15A), or alternatively from the S11 parameter (FIG. 15B). In particular, the resonant peaks correspond to Sensor A (at 17 MHz) and Sensor B (at 12 MHz) when the transmission coil is at 2 cm from Sensor A and 4 cm from Sensor B. The intensity of the peaks will decrease as the distance between the transmission and receiver increases.

Figure 16:
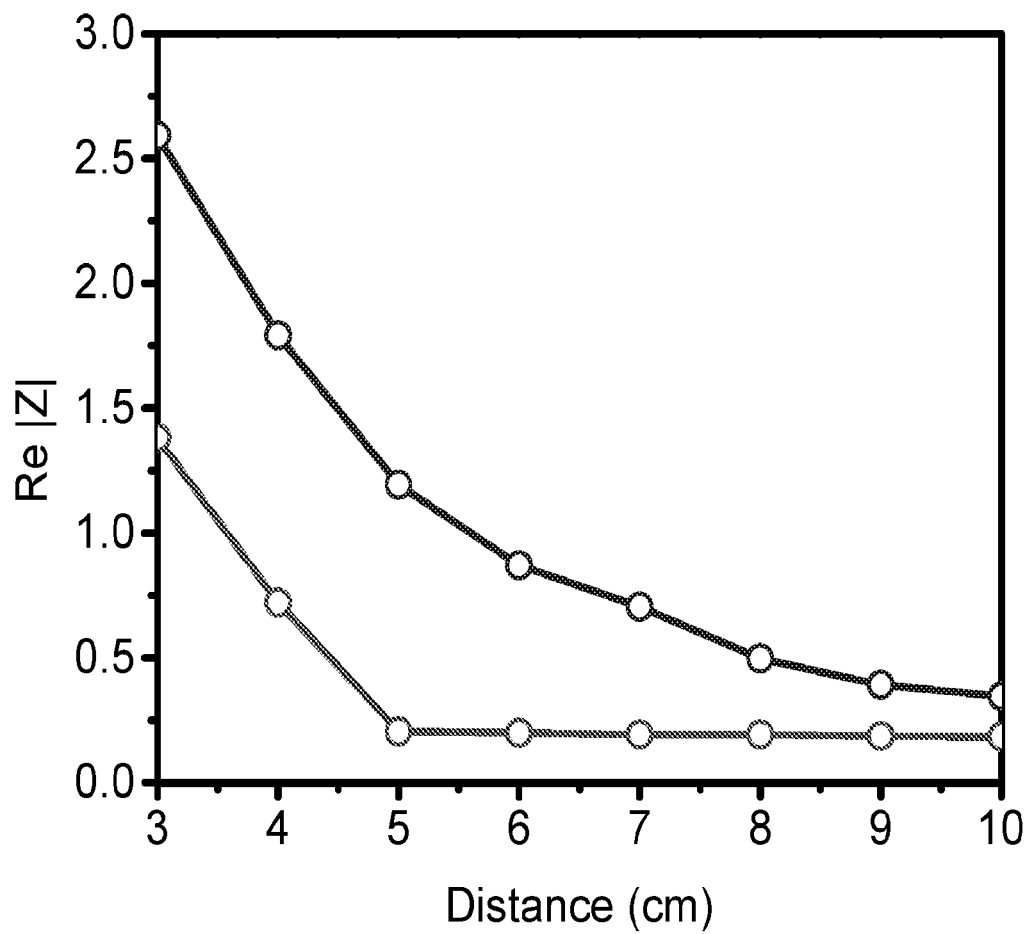
FIG. 16 shows a chart of the readout distance of the sensors as shown in FIG. 11A.

FIG. 16 shows a chart of the readout distance of the sensors as shown in FIG. 11A. As shown in FIG. 16, a distance sweep was performed to determine the readout range between the transmission coil and the sensors. As the distance between transmission coil and sensors increases, the peak value of Re |Z| decreases. For Sensor A (at 17 MHz) the resonance peaks are distinguishable for up to 10 cm. For sensor B (at 12 MHz), However, the resonance peaks become indistinguishable for distances above 5 cm.

In sum, the maximum diameter of the transmission coil was determined at 13.5 cm to allow both a readout distance of 10 cm and maintain a compact design based on experimental size constrains. Further, the influence of the tissue layers was considered by determining the strength of the magnetic field through the layers. At 10 cm distance, the modeling shows a 30% increase in the strength of the magnetic field. The readout distance was determined based on Re |Z| or S11 parameter by looking at the resonance peaks. From a distance sweep, sensor A can still show resonance peaks at distances of up to 10 cm, however, the resonances in sensor B become indistinguishable after 5 cm.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1]. W.-G. Ma et al., J Thorac Dis. 2015 December; 7(12): 2321-2329.
[2]. Koo et al., Nature Medicine (2018).

What is claimed is:

1. A detection system for an artificial aortic valve disposed between a left ventricle and an aorta of a mammal subject, comprising:
    a plurality of wireless inductor-resistor-capacitor (LCR)-based passive sensor systems, wherein the artificial aortic valve is configured to switch between an expanded state and a crimped state according to heartbeats of the mammal subject, and each of the wireless LCR-based passive sensor systems comprises:
        a deformable coil disposed on a surface of the artificial aortic valve, wherein the deformable coil forms an inductor-resistor; and
        a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject;
    wherein the wireless LCR-based passive sensor systems comprise:
        a first sensor system disposed at a first side of the artificial aortic valve adjacent to the left ventricle, wherein the LCR circuit of the first sensor system has a first self-resonant frequency; and
        a second sensor system disposed at a second side of the artificial aortic valve adjacent to the aorta, wherein the LCR circuit of the second sensor system has a second self-resonant frequency different from the first self-resonant frequency;
    a plurality of antennas respectively disposed on a skin of the mammal subject and wirelessly in communication with the deformation coils of the first and second sensor systems correspondingly, wherein the antennas is configured to measure the self-resonant frequencies of the LCR circuits of the first and second sensor systems; and
    a computing device communicatively connected to the antennas, configured to:
        calculate a first blood pressure of the mammal subject at the left ventricle based on the first self-resonant frequency measured by the antennas;
        calculate a second blood pressure of the mammal subject at the aorta based on the second self-resonant frequency measured by the antennas; and
        determine the status of the artificial aortic valve based on the first blood pressure and the second blood pressure.

2. The detection system of claim 1, wherein for each of the first and second sensor systems, the self-resonant frequency f of the LCR circuit is:

$$f = \frac{1}{2\pi\sqrt{LC(p)}},$$

wherein L is an inductance of the deformable coil, p is the first blood pressure or the second blood pressure, and C(p) is a capacitance function of the capacitive pressure sensor.

3. The detection system of claim 2, wherein for each of the first and second sensor systems, the self-resonant frequency f of the LCR circuit is in a range between 300 KHz and 50 MHz.

4. The detection system of claim 1, wherein each of the antennas is located within a maximum readout distance D from the artificial aortic valve.

5. The detection system of claim 4, wherein the maximum readout distance D is 10 cm.

6. The detection system of claim 1, wherein for each of the wireless LCR-based passive sensor systems, the deformable coil is a multi-turn coil comprising:
    a conductive metal wire; and
    a plurality of sleeves partially covering the conductive metal wire, wherein each of the sleeves is more rigid than the conductive metal wire, such that when the artificial aortic valve switches to the crimped state, the deformable coil deforms at locations not covered by the sleeves.

7. The detection system of claim 6, wherein multi-turn coil when the artificial aortic valve switches to the crimped state, an additional thickness of the deformable coil of each of the first and second sensor systems added on the surface of the artificial aortic valve in the crimped state is less than 1 mm.

8. The detection system of claim 6, wherein the deformable coil of the first sensor system and the deformable coil of the second sensor system have different turns.

9. An artificial aortic valve having the detection system of claim 1 implanted therein.

10. A method for detecting a status of an artificial aortic valve implanted between a left ventricle and an aorta of a mammal subject, comprising:
    disposing a plurality of wireless inductor-resistor-capacitor (LCR)-based passive sensor systems at different locations of the artificial aortic valve, wherein the artificial aortic valve is configured to switch between an expanded state and a crimped state according to heartbeats of the mammal subject, and each of the wireless LCR-based passive sensor systems comprises:

a deformable coil disposed on a surface of the artificial aortic valve, wherein the deformable coil forms an inductor-resistor; and a capacitive pressure sensor disposed in the artificial aortic valve, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a blood pressure of the mammal subject;

wherein the wireless LCR-based passive sensor systems comprise:

a first sensor system disposed at a first side of the artificial aortic valve, wherein the LCR circuit of the first sensor system has a first self-resonant frequency; and a second sensor system disposed at a second side of the artificial aortic valve, wherein the LCR circuit of the second sensor system has a second self-resonant frequency different from the first self-resonant frequency;

implanting the artificial aortic valve between the left ventricle and the aorta of the mammal subject, wherein the first side of the artificial aortic valve is adjacent to the left ventricle, and the second side of the artificial aortic valve is adjacent to the aorta;

disposing a plurality of antennas respectively on a skin of the mammal subject, wherein the antenna are wirelessly in communication with the deformation coils of the first and second sensor systems correspondingly;

measuring, by the antennas, the self-resonant frequencies of the LCR circuits of the first and second sensor systems;

calculating a first blood pressure of the mammal subject at the left ventricle based on the first self-resonant frequency measured by the antennas;

calculating a second blood pressure of the mammal subject at the aorta based on the second self-resonant frequency measured by the antennas; and determining the status of the artificial aortic valve based on the first blood pressure and the second blood pressure.

11. The method of claim 10, wherein for each of the first and second sensor systems, the self-resonant frequency f of the LCR circuit is:

$$f = \frac{1}{2\pi\sqrt{LC(p)}},$$

wherein L is an inductance of the deformable coil, p is the first blood pressure or the second blood pressure, and C(p) is a capacitance function of the capacitive pressure sensor.

12. The method of claim 11, wherein for each of the first and second sensor systems, the self-resonant frequency f of the LCR circuit is in a range between 300 KHz and 50 MHz.

13. The method of claim 10, wherein each of the antennas is located within a maximum readout distance D from the artificial aortic valve.

14. The method of claim 13, wherein the maximum readout distance D is 10 cm.

15. The method of claim 10, wherein for each of the wireless LCR-based passive sensor systems, the deformable coil is a multi-turn coil comprising:

a conductive metal wire; and a plurality of sleeves partially covering the conductive metal wire, wherein each of the sleeves is more rigid than the conductive metal wire, such that when the artificial aortic valve switches to the crimped state, the deformable coil deforms at locations not covered by the sleeves.

16. The method of claim 15, wherein when the artificial aortic valve switches to the crimped state, an additional thickness of the deformable coil of each of the first and second sensor systems added on the surface of the artificial aortic valve in the crimped state is less than 1 mm.

17. The method of claim 15, wherein the deformable coil of the first sensor system and the deformable coil of the second sensor system have different turns.

18. A detection system for a collapsible artificial valve or stent implanted in a mammal subject, comprising:

a plurality of wireless inductor-resistor-capacitor (LCR)-based passive sensor systems disposed at different locations of the collapsible artificial valve or stent, wherein the collapsible artificial valve or stent is configured to switch between an expanded state and a crimped state, and each of the wireless LCR-based passive sensor systems comprises:

a deformable coil disposed on a surface of the collapsible artificial valve or stent, wherein the deformable coil forms an inductor-resistor; and a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other;

a plurality of antennas respectively disposed on a skin of the mammal subject and wirelessly in communication with the deformation coils of the wireless LCR-based passive sensor systems correspondingly, wherein each of the antennas is configured to measure the self-resonant frequency of the LCR circuit of a corresponding one of the wireless LCR-based passive sensor systems; and a computing device communicatively connected to the antennas, configured to:

calculate a fluid pressure of the mammal subject at each of the locations of the collapsible artificial valve or stent based on the self-resonant frequencies of the LCR circuits of the wireless LCR-based passive sensor systems measured by the antennas; and determine the status of the collapsible artificial valve or stent based on the fluid pressure at each of the locations of the collapsible artificial valve or stent.

19. The detection system of claim 18, wherein for each of the wireless LCR-based passive sensor systems, the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

20. The detection system of claim 19, wherein for each of the wireless LCR-based passive sensor systems, the self-resonant frequency f of the LCR circuit is in a range between 300 KHz and 50 MHz.

21. The detection system of claim 18, wherein the collapsible artificial valve or stent is disposed in an arterial position of the mammal subject, the wireless LCR-based passive sensor systems are disposed at different sides of the collapsible artificial valve or stent in the arterial position, the fluid pressure is a blood pressure of the mammal subject, and the self-resonant frequencies of the LCR circuits of the wireless LCR-based passive sensor systems change in response to the collapsible artificial valve or stent switching between the expanded state and the crimped state.

22. The detection system of claim 21, wherein the collapsible artificial valve is an artificial aortic valve disposed between a left ventricle and an aorta of the mammal subject, and the wireless LCR-based passive sensor systems comprise:
a first sensor system disposed at a first side of the artificial aortic valve adjacent to the left ventricle, wherein the LCR circuit of the first sensor system has a first self-resonant frequency; and
a second sensor system disposed at a second side of the artificial aortic valve adjacent to the aorta, wherein the LCR circuit of the second sensor system has a second self-resonant frequency.

23. The detection system of claim 22, wherein the computing device is configured to calculate the blood pressure at the left ventricle of the mammal subject based on the first self-resonant frequency and the blood pressure at the aorta of the mammal subject based on the second self-resonant frequency, and determine a status of the artificial aortic valve based on the blood pressure at the left ventricle and the blood pressure at the aorta of the mammal subject.

24. The detection system of claim 21, wherein the collapsible artificial valve is an artificial mitral valve, an artificial tricuspid valve, or an artificial pulmonary valve.

25. The detection system of claim 21, wherein each of the antennas is located within a maximum readout distance D from the collapsible artificial valve or stent.

26. The detection system of claim 25, wherein the maximum readout distance D is 10 cm.

27. The detection system of claim 18, wherein for each of the wireless LCR-based passive sensor systems, the deformable coil is a multi-turn coil comprising:
a conductive metal wire; and
a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

28. The detection system of claim 27, wherein when the collapsible artificial valve or stent switches to the crimped state, an additional thickness of the deformable coil of each of the wireless LCR-based passive sensor systems added on the surface of the collapsible artificial valve or stent in the crimped state is less than 1 mm.

29. The detection system of claim 27, wherein the deformable coils of the wireless LCR-based passive sensor systems have different turns.

30. A collapsible artificial valve or stent having the detection system of claim 18 implanted therein.

31. A method for detecting a status of a collapsible artificial valve or stent implanted in a mammal subject, comprising:
disposing a plurality of wireless inductor-resistor-capacitor (LCR)-based passive sensor systems at different locations of the collapsible artificial valve or stent, wherein the collapsible artificial valve or stent is configured to switch between an expanded state and a crimped state, and each of the wireless LCR-based passive sensor systems comprises:
a deformable coil disposed on a surface of the collapsible artificial valve or stent, wherein the deformable coil forms an inductor-resistor; and
a capacitive pressure sensor disposed in the collapsible artificial valve or stent, wherein the capacitive pressure sensor comprises a plurality of sensor electrodes electrically connected to the deformable coil in parallel to form a capacitor, the capacitive pressure sensor and the deformable coil collectively form an LCR circuit having a self-resonant frequency configured to change based on a fluid pressure of the mammal subject, and the self-resonant frequencies of the LCR circuits of the wireless LCR-based passive sensor systems are different from each other;
implanting the collapsible artificial valve or stent in the mammal subject;
disposing a plurality of antennas respectively on a skin of the mammal subject, wherein the antenna are wirelessly in communication with the deformation coils of the wireless LCR-based passive sensor systems correspondingly;
measuring, by the antennas, the self-resonant frequencies of the LCR circuits of the wireless LCR-based passive sensor systems; and
determining the status of the collapsible artificial valve or stent based on a fluid pressure at each of the locations of the collapsible artificial valve or stent, wherein the fluid pressure is calculated based on the self-resonant frequencies of the LCR circuits of the wireless LCR-based passive sensor systems measured by the antennas.

32. The method of claim 31, wherein for each of the wireless LCR-based passive sensor systems, the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

33. The method of claim 32, wherein for each of the wireless LCR-based passive sensor systems, the self-resonant frequency f of the LCR circuit is in a range between 300 KHz and 50 MHz.

34. The method of claim 31, wherein the collapsible artificial valve or stent is disposed in an arterial position of the mammal subject, the wireless LCR-based passive sensor systems are disposed at different sides of the collapsible artificial valve or stent in the arterial position, the fluid pressure is a blood pressure of the mammal subject, and the self-resonant frequencies of the LCR circuits of the wireless LCR-based passive sensor systems change in response to the collapsible artificial valve or stent switching between the expanded state and the crimped state.

35. The method of claim 34, wherein the collapsible artificial valve is an artificial aortic valve disposed between a left ventricle and an aorta of the mammal subject, and the wireless LCR-based passive sensor systems comprise:
   a first sensor system disposed at a first side of the artificial aortic valve adjacent to the left ventricle, wherein the LCR circuit of the first sensor system has a first self-resonant frequency; and
   a second sensor system disposed at a second side of the artificial aortic valve adjacent to the aorta, wherein the LCR circuit of the second sensor system has a second self-resonant frequency.

36. The method of claim 35, wherein the status of the artificial aortic valve is determined by:
   calculating the blood pressure at the left ventricle of the mammal subject based on the first self-resonant frequency and the blood pressure at the aorta of the mammal subject based on the second self-resonant frequency; and
   determining the status of the artificial aortic valve based on the blood pressure at the left ventricle and the blood pressure at the aorta.

37. The method of claim 34, wherein the collapsible artificial valve is an artificial mitral valve, an artificial tricuspid valve, or an artificial pulmonary valve.

38. The method of claim 31, wherein each of the antennas is located within a maximum readout distance D from the collapsible artificial valve or stent.

39. The method of claim 38, wherein the maximum readout distance D is 10 cm.

40. The method of claim 31, wherein for each of the wireless LCR-based passive sensor systems, the deformable coil is a multi-turn coil comprising:
   a conductive metal wire; and
   a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

41. The method of claim 40, wherein when the collapsible artificial valve or stent switches to the crimped state, an additional thickness of the deformable coil of each of the wireless LCR-based passive sensor systems added on the surface of the collapsible artificial valve or stent in the crimped state is less than 1 mm.

42. The method of claim 40, wherein the deformable coils of the wireless LCR-based passive sensor systems have different turns.

43. A wireless inductor-resistor-capacitor (LCR)-based passive sensor system configured to be implanted in a mammal subject, comprising:
   a deformable coil disposed on a surface of a collapsible artificial valve or stent disposed in the mammal subject, wherein the deformable coil forms an inductor-resistor; and
   a capacitive pressure sensor disposed in the collapsible artificial valve or stent, wherein the capacitive pressure sensor comprises a plurality of sensor electrodes electrically connected to the deformable coil in parallel to form a capacitor, and the capacitive pressure sensor and the deformable coil collectively form an LCR circuit having a self-resonant frequency configured to change based on a fluid pressure of the mammal subject;
   wherein an antenna is disposed on a skin of the mammal subject and wirelessly in communication with the deformable coil, and the antenna is configured to measure the self-resonant frequency of the LCR circuit from the deformable coil;
   wherein the self-resonant frequency of the LCR circuit measured by the antenna is capable of being used to calculate the fluid pressure of the mammal subject.

44. The wireless LCR-based passive sensor system of claim 43, wherein the self-resonant frequency f of the LCR circuit is:

$$f = \frac{1}{2\pi\sqrt{LC(p)}},$$

wherein L is an inductance of the deformable coil, p is the fluid pressure of the mammal subject, and C(p) is a capacitance function of the capacitive pressure sensor.

45. The wireless LCR-based passive sensor system of claim 44, wherein the self-resonant frequency f of the LCR circuit is in a range between 300 KHz and 50 MHz.

46. The wireless LCR-based passive sensor system of claim 43, wherein the collapsible artificial valve or stent is disposed in an arterial position of the mammal subject and is configured to switch between an expanded state and a crimped state, and the fluid pressure is a blood pressure of the mammal subject at the arterial position.

47. The wireless LCR-based passive sensor system of claim 43, wherein the antenna is located within a maximum readout distance D from the collapsible artificial valve or stent.

48. The wireless LCR-based passive sensor system of claim 47, wherein the maximum readout distance D is 10 cm.

49. The wireless LCR-based passive sensor system of claim 43, wherein the collapsible artificial valve is an artificial aortic valve, an artificial mitral valve, an artificial tricuspid valve, or an artificial pulmonary valve.

50. The wireless LCR-based passive sensor system of claim 43, wherein the deformable coil is a multi-turn coil comprising:
   a conductive metal wire; and
   a plurality of sleeves partially covering the conductive metal wire, wherein each of the sleeves is more rigid than the conductive metal wire, such that when the collapsible artificial valve or stent switches to the crimped state, the deformable coil deforms at locations not covered by the sleeves.

51. The wireless LCR-based passive sensor system of claim 50, wherein when the collapsible artificial valve or stent switches to the crimped state, an additional thickness of the deformable coil added on the surface of the collapsible artificial valve or stent in the crimped state is less than 1 mm.

* * * * *